(12) United States Patent
Kufeld et al.

(10) Patent No.: US 9,469,707 B2
(45) Date of Patent: *Oct. 18, 2016

(54) PRESSURE MANAGEMENT FOR SLURRY POLYMERIZATION

(71) Applicant: Chevron Phillips Chemical Company LP, The Woodlands, TX (US)

(72) Inventors: Scott E. Kufeld, Houston, TX (US); Bruce E. Kreischer, Humble, TX (US); John D. Hottovy, Porter, TX (US)

(73) Assignee: Chevron Philips Chemical Company LP, The Woodlands, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/962,228

(22) Filed: Dec. 8, 2015

(65) Prior Publication Data

US 2016/0083486 A1 Mar. 24, 2016

Related U.S. Application Data

(63) Continuation of application No. 14/492,527, filed on Sep. 22, 2014, now Pat. No. 9,238,698, which is a continuation-in-part of application No. 13/778,881, filed on Feb. 27, 2013, now Pat. No. 8,883,940, which is a continuation of application No. 13/664,944, filed on Oct. 31, 2012, now Pat. No. 8,921,498.

(51) Int. Cl.
*C08F 2/00* (2006.01)
*C08F 110/02* (2006.01)
(Continued)

(52) U.S. Cl.
CPC .......... *C08F 110/02* (2013.01); *B01J 19/1837* (2013.01); *C08F 2/01* (2013.01);
(Continued)

(58) Field of Classification Search
CPC .......... C08F 10/02; C08F 2/00; C08F 2/14; C08F 2/01; C08F 6/003; C08F 210/16; C08F 210/14; C08L 23/06; B01J 19/1837; B01J 2210/0006; B01J 2210/00103; B01J 2219/00164; B01J 2219/00184; B01J 2219/00198; B01J 2219/002; B01J 2219/00202; B01J 2219/00231; B01J 2219/00162; C08J 11/02
USPC .................................................. 526/64, 352
See application file for complete search history.

(56) References Cited

U.S. PATENT DOCUMENTS 3,248,179 A 4/1966 Norwood
4,312,967 A 1/1982 Norwood et al.
(Continued)

FOREIGN PATENT DOCUMENTS

EP 0891990 A2 1/1999
EP 1630178 A1 3/2006
(Continued)

OTHER PUBLICATIONS

Bell, Susan L., "Polyethylene by Borealis' Borstar Process," PEP Review No. 2005-6, Dec. 2005, 29 pages.
(Continued)

*Primary Examiner* — William Cheung
(74) *Attorney, Agent, or Firm* — Conley Rose, P.C.; Rodney B. Carroll; Monte R. Rhodes

(57) ABSTRACT

Processes and systems for the production for pressure management of a polymerization product flowing from a loop polymerization reactor to a separation vessel in a slurry polymerization system are disclosed herein. For example, a process comprises withdrawing a polymerization product slurry from a loop polymerization reactor, conveying the polymerization product slurry through a first line comprising a continuous take-off valve to yield a mixture comprising a vapor phase, wherein the mixture exits the continuous take-off valve, and conveying the mixture through a second line comprising a flashline heater so that the mixture has a Froude number in a range from about 5 to about 100.

20 Claims, 3 Drawing Sheets

(51) Int. Cl.
*C08F 2/01* (2006.01)
*B01J 19/18* (2006.01)
*C08F 2/14* (2006.01)
*C08F 6/00* (2006.01)
*C08J 11/02* (2006.01)

(52) U.S. Cl.
CPC ............... *C08F 2/14* (2013.01); *C08F 6/003* (2013.01); *C08J 11/02* (2013.01); *B01J 2219/002* (2013.01); *B01J 2219/00006* (2013.01); *B01J 2219/00103* (2013.01); *B01J 2219/00162* (2013.01); *B01J 2219/00164* (2013.01); *B01J 2219/00184* (2013.01); *B01J 2219/00198* (2013.01); *B01J 2219/00202* (2013.01); *B01J 2219/00231* (2013.01)

(56) References Cited

U.S. PATENT DOCUMENTS

| | | |
|---|---|---|
| 4,501,885 A | 2/1985 | Sherk et al. |
| 4,588,790 A | 5/1986 | Jenkins, III et al. |
| 4,589,957 A | 5/1986 | Sherk et al. |
| 4,754,007 A | 6/1988 | Pullukat et al. |
| 5,016,857 A | 5/1991 | Bovee et al. |
| 5,352,749 A | 10/1994 | DeChellis et al. |
| 5,391,654 A | 2/1995 | Ahvenainen et al. |
| 5,436,304 A | 7/1995 | Griffin et al. |
| 5,455,314 A | 10/1995 | Burns et al. |
| 5,565,174 A | 10/1996 | Burns et al. |
| 5,565,175 A | 10/1996 | Hottovy et al. |
| 5,575,979 A | 11/1996 | Hanson |
| 6,045,661 A | 4/2000 | Kreischer et al. |
| 6,127,495 A | 10/2000 | Rösch et al. |
| 6,239,235 B1 | 5/2001 | Hottovy et al. |
| 6,262,191 B1 | 7/2001 | Hottovy et al. |
| 6,559,247 B2 | 5/2003 | Kufeld et al. |
| 6,806,338 B2 | 10/2004 | Baann et al. |
| 6,815,511 B2 | 11/2004 | Verser et al. |
| 6,833,415 B2 | 12/2004 | Kendrick et al. |
| 7,014,821 B2 | 3/2006 | Hottovy et al. |
| 7,163,906 B2 | 1/2007 | McDaniel et al. |
| 7,505,129 B2 | 3/2009 | Marrow et al. |
| 7,517,947 B2 | 4/2009 | McElvain et al. |
| 7,619,047 B2 | 11/2009 | Yang et al. |
| 7,759,457 B2 | 7/2010 | Walworth |
| 7,790,820 B2 | 9/2010 | Jensen et al. |
| 7,812,104 B2 | 10/2010 | Canich et al. |
| 7,910,679 B2 | 3/2011 | Kiss et al. |
| 7,928,162 B2 | 4/2011 | Kiss et al. |
| 7,939,610 B2 | 5/2011 | Kiss et al. |
| 7,957,947 B2 | 6/2011 | Odi |
| 7,960,487 B2 | 6/2011 | Yang et al. |
| 7,964,699 B2 | 6/2011 | Marissal et al. |
| 8,597,582 B2 | 12/2013 | Hottovy et al. |
| 8,653,206 B2 | 2/2014 | Gessner et al. |
| 8,710,161 B2 | 4/2014 | Fouarge et al. |
| 8,871,886 B1 | 10/2014 | Hottovy et al. |
| 8,883,940 B2* | 11/2014 | Kufeld ...................... C08F 2/01 422/131 |
| 8,921,498 B2* | 12/2014 | Kufeld ...................... C08F 2/01 422/131 |
| 9,096,694 B1 | 8/2015 | Gupta et al. |
| 9,120,886 B2 | 9/2015 | Hottovy et al. |
| 9,238,698 B2* | 1/2016 | Kufeld ...................... C08J 11/02 |
| 2004/0136881 A1 | 7/2004 | Verser et al. |
| 2005/0091021 A1 | 4/2005 | Gupta et al. |
| 2005/0272914 A1 | 12/2005 | McElvain et al. |
| 2009/0004417 A1 | 1/2009 | Follestad et al. |
| 2010/0144985 A1 | 6/2010 | Lee et al. |
| 2011/0190465 A1* | 8/2011 | Hottovy ................... B01J 8/005 526/348 |
| 2015/0011718 A1 | 1/2015 | Kufeld et al. |
| 2015/0259441 A1 | 9/2015 | Gupta et al. |
| 2015/0329650 A1 | 11/2015 | Hottovy et al. |

FOREIGN PATENT DOCUMENTS

| | | |
|---|---|---|
| EP | 1914247 A1 | 4/2008 |
| EP | 2103634 A1 | 9/2009 |
| EP | 2336200 A1 | 6/2011 |
| WO | 02090400 A1 | 11/2002 |
| WO | 2004024780 A1 | 3/2004 |
| WO | 2006056763 A1 | 6/2006 |
| WO | 2009127643 A1 | 10/2009 |
| WO | 2011097119 A1 | 8/2011 |
| WO | 2014070608 A1 | 5/2014 |
| WO | 2014093088 A1 | 6/2014 |
| WO | 2015109184 A1 | 7/2015 |

OTHER PUBLICATIONS

Filing receipt and specification for patent application entitled "Polymerization Product Pressures in Olefin Polymerization," by John D. Hottovy, et al., filed May 6, 2016 as U.S. Appl. No. 15/148,401.

Foreign communication from a related counterpart application—International Search Report and Written Opinion, PCT/US2011/022812, Mar. 21, 2011, 9 pages.

Foreign communication from a related counterpart application—International Preliminary Report on Patentability, PCT/US2011/022812, Aug. 7, 2012, 7 pages.

Speight, James G., Lange's Handbook of Chemistry, Sixteenth Edition, 2005, Section 1.14, 1 page.

"Supercritical Loop Reactor Slurry Process for Producing Polyethylene and Polypropylene," Process Economics Program Report 19F, Jun. 1996, 134 pages.

Notice of Allowance dated Mar. 28, 2016 (12 pages), U.S. Appl. No. 14/725,954 filed May 29, 2015.

Foreign communication from a related counterpart application—International Search Report and Written Opinion, PCT/US2013/066842, Jan. 22, 2014, 9 pages.

Foreign communication from a related counterpart application—International Preliminary Report on Patentability, PCT/US2013/066842, May 5, 2015, 7 pages.

Foreign communication from a related counterpart application—International Search Report and Written Opinion, PCT/US2015/011757, Apr. 24, 2015, 9 pages.

Office Action dated Jun. 26, 2015 (34 pages), U.S. Appl. No. 14/492,527, filed Sep. 22, 2014.

Office Communication regarding a third-party submission dated Jul. 22, 2015 (23 pages), U.S. Appl. No. 14/492,527, filed Sep. 22, 2014.

Notice of Allowance dated Oct. 1, 2015 (17 pages), U.S. Appl. No. 14/492,527, filed Sep. 22, 2014.

Office Action dated Dec. 30, 2015 (34 pages), U.S. Appl. No. 14/725,954, filed May 29, 2015.

Office Action dated Jan. 29, 2016 (26 pages), U.S. Appl. No. 14/810,734, filed Jul. 28, 2015.

Office Action (Final) dated Apr. 18, 2016 (17 pages), U.S. Appl. No. 14/810,734, filed Jul. 28, 2015.

* cited by examiner

PRESSURE MANAGEMENT FOR SLURRY POLYMERIZATION

CROSS-REFERENCE TO RELATED APPLICATIONS

This application is a continuation of and claims priority to U.S. patent application Ser. No. 14/492,527 filed on Sep. 22, 2014, now U.S. Pat. No. 9,238,698 B2, which is a continuation-in-part of and claims priority to U.S. patent application Ser. No. 13/778,881 filed on Feb. 27, 2013, now U.S. Pat. No. 8,883,940 B2, which is a continuation of and claims priority to U.S. patent application Ser. No. 13/664,944 filed on Oct. 31, 2012, now U.S. Pat. No. 8,921,498 B2, all entitled "Pressure Management for Slurry Polymerization," each of which is incorporated by reference herein in its entirety.

STATEMENT REGARDING FEDERALLY SPONSORED RESEARCH OR DEVELOPMENT

Not applicable.

REFERENCE TO A MICROFICHE APPENDIX

Not applicable.

FIELD

This disclosure relates to the control of pressures downstream of a polymerization reactor.

BACKGROUND

Polyolefins such as polyethylene and polypropylene may be prepared by slurry polymerization. In this technique, feed materials such as diluent, monomer and catalyst are introduced to a loop reaction zone, forming a slurry in the reaction zone. In continuous loop reactors, the slurry circulates through the loop reaction zone, and the monomer reacts at the catalyst in a polymerization reaction. The polymerization reaction yields solid polyolefins in the slurry. A polymerization product having solid polyolefins is then transferred from the reactor and separated to recover the solid polyolefins. Operating pressures during transfer of the product can affect recovery of solid polyolefins; thus, pressure management can be important.

SUMMARY

Disclosed herein is a process for pressure management of a polymerization product in slurry polymerization, comprising withdrawing a polymerization product slurry from a loop polymerization reactor, conveying the polymerization product slurry through a first line comprising a continuous take-off valve to yield a mixture comprising a vapor phase, wherein the mixture exits the continuous take-off valve, and conveying the mixture through a second line comprising a flashline heater so that the mixture has a Froude number in a range from about 5 to about 100.

Also disclosed herein is a process for pressure management of a polymerization product slurry withdrawn from a loop polymerization reactor in slurry polymerization, comprising conveying the polymerization product slurry through a continuous take-off valve, converting the polymerization product slurry to a mixture comprising a vapor phase, wherein the mixture exits the continuous take-off valve, and conveying the mixture through a flashline heater, wherein the mixture in the flashline heater has a Froude number in a range of 5 to 100.

Also disclosed herein is a system for pressure management of a polymerization product in a loop polymerization process, comprising a polymerization reactor to form the polymerization product, a first line comprising a continuous take-off valve, wherein the first line receives a polymerization product slurry from the loop slurry polymerization reactor, wherein at least a portion of the polymerization product slurry converts to a mixture comprising a vapor phase which exits the continuous take-off valve, a second line comprising a flashline heater, wherein the second line receives a mixture from the first line, and a separation vessel to receive the mixture from the second line. A first pressure differential may be associated with the first line, a second pressure differential may be associated with the second line, the first pressure differential may be less than or greater than the second pressure differential, and a solid polymer may be recovered from the separation vessel.

DETAILED DESCRIPTION OF THE EMBODIMENTS

Disclosed herein are embodiments of a system for pressure management of a polymerization product in a loop polymerization process. Additionally, disclosed herein are various methods for pressure management of a polymerization product flowing from a loop polymerization reactor to a separation vessel in slurry polymerization.

Figure 1:
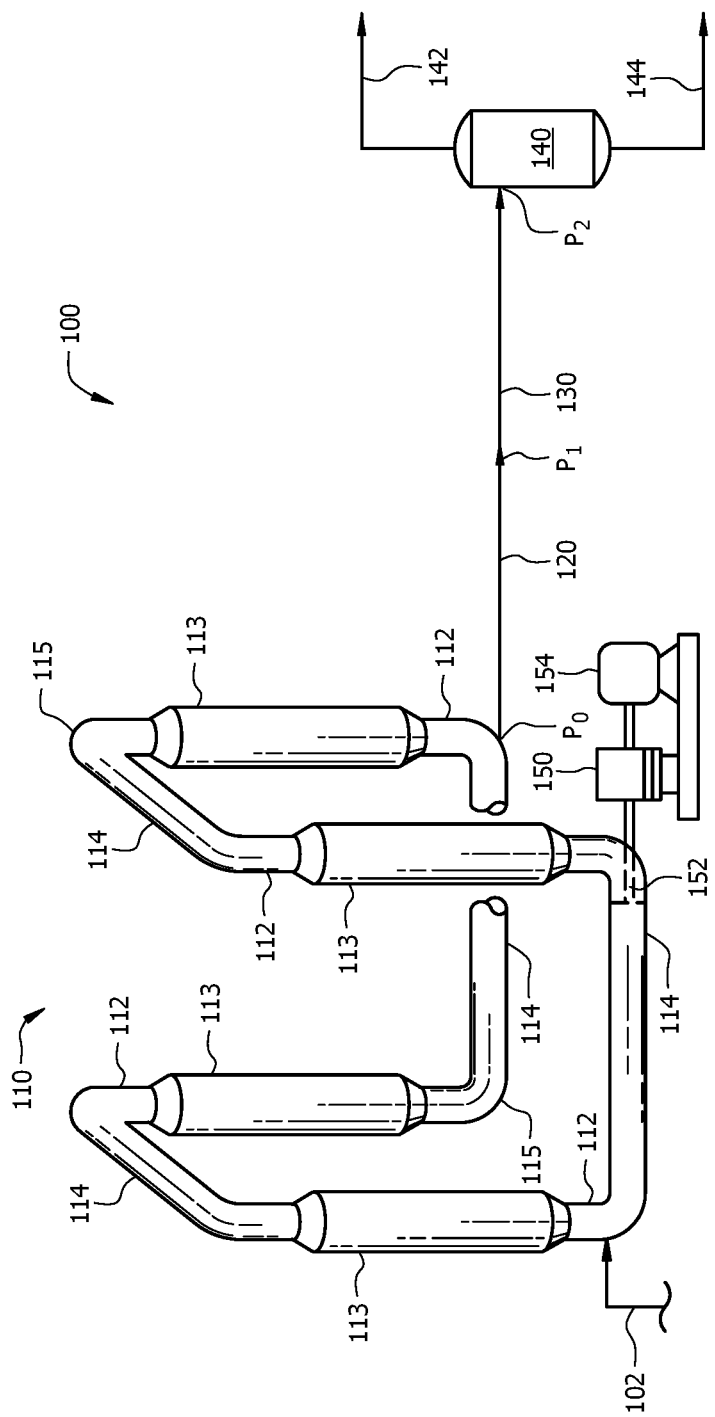
FIG. 1 shows a process flow diagram of an embodiment of a system for pressure management of a polymerization product in a loop polymerization process.

FIG. 1 shows a process flow diagram of an embodiment of a system 100 for pressure management of a polymerization product in a loop polymerization process. The system 100 may comprise a loop slurry polymerization reactor 110 which forms polymerization product, a first line 120 which receives a polymerization product (e.g., as a polymerization product slurry) from the loop slurry polymerization reactor 110, a second line 130 which receives the polymerization product (e.g., as the polymerization product slurry) from the first line 120, and a separation vessel 140 which receives the polymerization product (e.g., as the polymerization product slurry) from the second line 130. Solid polymer may be recovered from the separation vessel 140.

As disclosed above, the system 100 may comprise a loop slurry polymerization reactor 110. In one or more of the embodiments disclosed herein, the reactor 110 may comprise any vessel or combination of vessels suitably configured to provide an environment for a chemical reaction (e.g., a contact zone) between monomers (e.g., ethylene) and/or polymers (e.g., an "active" or growing polymer chain), and optionally comonomers (e.g., butene-1, hexene) and/or copolymers, in the presence of a catalyst to yield a polymer (e.g., a polyethylene polymer) and/or copolymer. Although the embodiment illustrated in FIG. 1 shows a single reactor 110, one of skill in the art viewing this disclosure will recognize that any suitable number and/or configuration of reactors may be employed.

As used herein, the terms "polymerization reactor" or "reactor" may include at least one loop slurry polymerization reactor capable of polymerizing olefin monomers or comonomers to produce homopolymers or copolymers. Such homopolymers and copolymers are referred to as resins or polymers.

The polymerization processes performed in the reactor(s) (e.g., reactor 110) may include batch or continuous processes. Continuous processes could use intermittent or continuous product discharge. Processes may also include partial or full direct recycle of unreacted monomer, unreacted comonomer, and/or diluent.

In embodiments having multiple reactors, production of polymerization product in multiple reactors may include several stages in at least two separate polymerization reactors interconnected by a transfer device making it possible to transfer the polymerization product resulting from a first polymerization reactor into a second reactor (e.g., loop slurry polymerization reactor 110). The desired polymerization conditions in one reactor may be different from the polymerization conditions of the other reactor(s). Alternatively, polymerization in multiple reactors may include the manual transfer of polymerization product (e.g., in a polymerization product slurry, as a mixture, as solid polymer, or combinations thereof) from one reactor to subsequent reactors for continued polymerization. Multiple reactor systems may include any combination including, but not limited to, multiple loop reactors, a combination of loop and gas reactors, multiple high pressure reactors or a combination of high pressure with loop and/or gas reactors. The multiple reactors may be operated in series, in parallel, or combinations thereof.

According to one aspect, the loop slurry polymerization reactor 110 may comprise vertical or horizontal pipes 112 and 114 interconnected by smooth bends or elbows 115, which together form a loop. Portions of the loop slurry polymerization reactor 110, such as pipes 112, may have cooling jackets 113 placed therearound to remove excess heat generated by the exothermic polymerization reactions. A cooling fluid may be circulated through jackets 113, for example.

A motive device, such as pump 150, may circulate the fluid slurry in the loop slurry polymerization reactor 110. An example of the pump 150 is an in-line axial flow pump with a pump impeller 152 disposed within the interior of the reactor 140. The impeller 152 may, during operation, create a turbulent mixing zone within a fluid medium circulating through the reactor 110 such that sufficient contact between different polymerization components within the slurry may occur. The impeller 152 may also assist in propelling the slurry through the closed loop of the reactor 110 at sufficient speed to keep solid particulates, such as the catalyst or polymerization product, suspended within the slurry. The impeller 152 may be driven by a motor 154 or other motive force.

The system 100 may additionally comprise any equipment associated with a polymerization reactor, such as pumps, control devices (e.g., a PID controller), measurement instruments (e.g., thermocouples, transducers, and flow meters), alternative inlet and outlet lines, etc.

Monomer, diluent, catalyst, and optionally any comonomer, which may be fed to the slurry loop polymerization reactor 110 (e.g., via feed stream 102), may circulate through the loop as polymerization occurs. Generally, continuous processes may comprise the continuous introduction of a monomer, an optional comonomer, a catalyst, and a diluent into the loop slurry polymerization reactor 110 and the continuous removal (e.g., via first line 120) of a slurry comprising solid polymer (e.g., polyethylene) and a liquid phase of the diluent.

In one or more embodiments, a comonomer may comprise unsaturated hydrocarbons having 3 to 12 carbon atoms. For example, a comonomer may comprise propene, butene-1, hexene-1, octenes, or combinations thereof.

In embodiments, suitable diluents used in slurry polymerization processes may include, but are not limited to, the monomer, and optionally, the comonomer, being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. In embodiments, diluents may comprise unsaturated hydrocarbons having 3 to 12 carbon atoms. Further examples of suitable diluents include, but are not limited to propene, butene-1, hexene-1, octenes, or combinations thereof. Some loop polymerization reactions can occur under bulk conditions where no diluent is used. An example is polymerization of propylene monomer as disclosed in U.S. Pat. No. 5,455,314, which is incorporated by reference herein in its entirety.

A typical loop polymerization process is disclosed, for example, in U.S. Pat. Nos. 3,248,179, 4,501,885, 5,565,175, 5,575,979, 6,239,235, 6,262,191 and 6,833,415, each of which is incorporated by reference in its entirety herein.

In embodiments having multiple reactors, various types of reactors that may additionally be included in system 100 may comprise gas-phase reactors. Gas-phase reactors may comprise fluidized bed reactors or staged horizontal reactors. Gas-phase reactors may employ a continuous recycle stream containing one or more monomers continuously cycled through a fluidized bed in the presence of the catalyst under polymerization conditions. A recycle stream may be withdrawn from the fluidized bed and recycled back into the reactor. Simultaneously, polymer product may be withdrawn from the reactor and new or fresh monomer may be added to replace the polymerized monomer. Likewise, copolymer product may optionally be withdrawn from the reactor and new or fresh comonomer may be added to replace polymerized comonomer, polymerized monomer, or combinations thereof. Such gas phase reactors may comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 5,352,749, 4,588,790 and 5,436,304, each of which is incorporated by reference in its entirety herein.

In embodiments having multiple reactors, various types of reactors that may additionally be included in system 100 may comprise loop slurry polymerization reactors. Such reactors may have a loop configuration, such as the configuration of the loop slurry polymerization reactor 110 of FIG. 1.

In embodiments having multiple reactors, various types of reactors that may additionally be included in system 100 may comprise high pressure reactors. High pressure reactors may comprise autoclave or tubular reactors. Tubular reactors may have several zones where fresh monomer (optionally, comonomer), initiators, or catalysts may be added. Monomer (optionally, comonomer) may be entrained in an inert gaseous stream and introduced at one zone of the reactor. Initiators, catalysts, and/or catalyst components may be entrained in a gaseous stream and introduced at another zone of the reactor. The gas streams may be intermixed for polymerization. Heat and pressure may be employed appropriately to obtain optimal polymerization reaction conditions.

In embodiments having multiple reactors, various types of reactors that may additionally be included in system 100 may comprise a solution polymerization reactor wherein the monomer (optionally, comonomer) may be contacted with the catalyst composition by suitable stirring or other means. A carrier comprising an inert organic diluent or excess monomer (optionally, comonomer) may be employed. If desired, the monomer and/or optional comonomer may be brought in the vapor phase into contact with the catalytic reaction product, in the presence or absence of liquid material. The polymerization zone is maintained at temperatures and pressures that will result in the formation of a solution of the polymer in a reaction medium. Agitation may be employed to obtain better temperature control and to maintain uniform polymerization mixtures throughout the polymerization zone. Adequate means are utilized for dissipating the exothermic heat of polymerization.

Conditions of a polymerization reactor, e.g., loop slurry polymerization reactor 110, which may be chosen and even controlled for polymerization efficiency and to provide resin properties include temperature, pressure and the concentrations of various reactants. Polymerization temperature can affect catalyst productivity, polymer molecular weight and molecular weight distribution. Suitable polymerization temperature may be any temperature below the de-polymerization temperature according to the Gibbs Free energy equation. Typically this includes from about 60° C. to about 280° C., for example, and from about 70° C. to about 110° C., depending upon the type of polymerization reactor.

Suitable pressures will also vary according to the reactor and polymerization type. The pressure for liquid phase polymerizations in a loop reactor such as loop slurry polymerization reactor 110 is typically less than 1,000 psig, for example, about 650 psig. Pressure for gas phase polymerization is usually at about 200 to 500 psig. High pressure polymerization in tubular or autoclave reactors is generally run at about 20,000 to 75,000 psig. Polymerization reactors can also be operated in a supercritical region occurring at generally higher temperatures and pressures. Operation above the critical point of a pressure/temperature diagram (supercritical phase) may offer advantages. In an embodiment, polymerization may occur in an environment having a suitable combination of temperature and pressure. For example, polymerization may occur at a pressure in a range of about 400 psi to about 1,000 psi; alternatively, about 550 psi to about 650 psi, alternatively, about 600 psi to about 625 psi; and a temperature in a range of about 150° F. to about 230° F., alternatively, from about 195° F. to about 220° F.

The concentration of various reactants can be controlled to produce solid polymer with certain physical and mechanical properties. The proposed end-use product that will be formed by the solid polymer and the method of forming that product determines the desired properties. Mechanical properties include tensile, flexural, impact, creep, stress relaxation and hardness tests. Physical properties include density, molecular weight, molecular weight distribution, melting temperature, glass transition temperature, temperature melt of crystallization, density, stereoregularity, crack growth, long chain branching and rheological measurements.

The concentrations and/or partial pressures of monomer, comonomer, hydrogen, co-catalyst, modifiers, and electron donors are important in producing these resin properties. Comonomer may be used to control product density. Hydrogen may be used to control product molecular weight. Cocatalysts can be used to alkylate, scavenge poisons and control molecular weight. Activator-support can be used to activate and support the catalyst. Modifiers can be used to control product properties and electron donors affect stereo-regularity, the molecular weight distribution, or molecular weight. In addition, the concentration of poisons is minimized because poisons impact the reactions and product properties.

Polymerization reaction components of the reactor(s) disclosed herein (e.g., loop slurry polymerization reactor 110) may include olefin monomers (e.g., ethylene) and comonomers (e.g., hexene), diluent (e.g., isobutane, hexane, propane, or combinations thereof), molecular weight control agents (e.g., hydrogen), and any other desired co-reactants or additives. Polymerization reaction components may additionally include a catalyst, and optionally, a co-catalyst. Suitable catalyst for polymerizing the monomers and any comonomers may include, but is not limited to a catalyst(s) and, optionally, a co-catalyst(s) and/or a promoter(s). Non-limiting examples of suitable catalyst systems include Ziegler Natta catalysts, Ziegler catalysts, chromium catalysts, chromium oxide catalysts, chromocene catalysts, metallocene catalysts, nickel catalysts, or combinations thereof. Nonlimiting examples of co-catalyst include triethylboron, methyl aluminoxane, alkyls such as triethylaluminum, or combinations thereof. Suitable activator-supports may comprise solid super acid compounds. Catalyst systems suitable for use in this disclosure have been described, for example, in U.S. Pat. No. 7,619,047 and U.S. Patent Application Publication Nos. 2007/0197374, 2009/0004417, 2010/0029872, 2006/0094590, and 2010/0041842, each of which is incorporated by reference herein in its entirety.

The reaction components may be introduced to an interior of the loop slurry polymerization reactor 110 via inlets or conduits at specified locations, such as feed line 102. Any combination of the reaction components identified above (and others known to those skilled in the art), together with any catalyst and/or co-catalyst described herein, may form a suspension, i.e., a slurry, that circulates through the loop formed by the loop slurry polymerization reactor 110.

The slurry may circulate through the loop slurry polymerization reactor 110, and monomers (and optionally, comonomers) may polymerize to form a polymerization product. The polymerization product may comprise a polymerization product slurry, a product mixture, or combinations thereof.

In embodiments, the polymerization product slurry may comprise solid polymer and a liquid phase of a diluent. In an embodiment, the polymerization product slurry may comprise unreacted monomer and/or unreacted comonomer in a liquid phase. In additional or alternative embodiments, the polymerization product slurry may generally comprise various solids, semi-solids, volatile and nonvolatile liquids, or combinations thereof. In an embodiment, the polymerization product slurry may comprise one or more of hydrogen, nitrogen, methane, ethylene, ethane, propylene, propane, butane, isobutane, pentane, hexane, hexene-1 and heavier hydrocarbons. In an embodiment, ethylene may be present in a range of from about 0.1% to about 15%, alternatively, from about 1.5% to about 5%, alternatively, about 2% to about 4% by total weight of the liquid in the product line. Ethane may be present in a range of from about 0.001% to about 4%, alternatively, from about 0.2% to about 0.5% by total weight of the material in the product line. Isobutane may be present in a range from about 80% to about 98%, alternatively, from about 92% to about 96%, alternatively, about 95% by total weight of the material in the product line.

In embodiments, the product mixture may comprise the solid polymer and a vapor phase of at least a portion of the diluent. In additional or alternative embodiments, the mixture may comprise unreacted, gaseous monomers or optional comonomers (e.g., unreacted ethylene monomers, unreacted butene-1 monomers), gaseous waste products, gaseous contaminants, or combinations thereof. As used herein, an "unreacted monomer," for example, ethylene, refers to a monomer that was introduced into a polymerization reactor during a polymerization reaction but was not incorporated into a polymer. As used herein, an "unreacted comonomer," for example, butene-1, refers to a comonomer that was introduced into a polymerization reactor during a polymerization reaction but was not incorporated into a polymer. Such gaseous phase product mixtures may be present when gas phase reactors are used in place of or in addition to a loop slurry reactor.

In embodiments, the solid polymer may comprise a homopolymer, a copolymer, or combinations thereof. The homopolymer and/or the polymers of the copolymer may comprise a multimodal (e.g., a bimodal) polymer (e.g., polyethylene). For example, the solid polymer may comprise both a relatively high molecular weight, low density (HMWLD) polyethylene polymer component and a relatively low molecular weight, high density (LMWHD) polyethylene polymer component. Various types of suitable polymers may be characterized as having a various densities. For example, a Type I may be characterized as having a density in a range of from about 0.910 g/cm$^3$ to about 0.925 g/cm$^3$, alternatively, a Type II may be characterized as having a density from about 0.926 g/cm$^3$ to about 0.940 g/cm$^3$, alternatively, a Type III may be characterized as having a density from about 0.941 g/cm$^3$ to about 0.959 g/cm$^3$, alternatively, a Type IV may be characterized as having a density of greater than about 0.960 g/cm$^3$. The solid polymer may comprise other polyolefin polymers.

The polymerization product (e.g., polymerization product slurry) may be withdrawn from one or more reactors present in system 100, e.g., the loop slurry polymerization reactor 110, via first line 120. The withdrawn polymerization product may be conveyed through the first line 120 to the second line 130. Collectively, lines 120 and 130 may be referred to as a flashline between reactor 110 and separation vessel 140, wherein a portion, substantially all, or all (e.g., 100%) of liquid phase components present in the polymerization product are converted to gas phase components. The polymerization product may be conveyed through the second line 130 to the separation vessel 140. In embodiments, the second line 130 may be downstream of the first line 120. In embodiments, the first line may have an inner diameter of about 1 inch to about 8 inches, and the second line 130 may have an inner diameter of about 2 inches to about 10 inches. For example, at least a portion of the second line 130 may have an inner diameter in a range from about 2 inches to about 10 inches which is greater than an inner diameter of the first line 120 in a range from about 1 inch to about 8 inches. In additional embodiments, the inner diameter of the second line 130 may change (e.g., increase) along the length of the second line 130.

In an embodiment, a polymerization product slurry in the polymerization product may convert to an at least partial gas phase product mixture in the first line 120, the second line 130, or combinations thereof. Thus, in embodiments, the polymerization product conveyed through lines 120 and 130 may be in the form of a liquid polymerization product slurry (e.g., a slurry of solid polymer and liquid phase diluent and/or unreacted monomer/comonomer), a gas phase product mixture (e.g., solid polymer and gas phase diluent and/or unreacted monomer/comonomer), or combinations thereof (e.g., a three-phase mixture of liquid and gaseous diluent and/or unreacted monomer/comonomer and solid polymer), and the form of the polymerization product may be a function of the conditions (e.g., temperature and pressure) present at a given location in lines 120 and 130.

In embodiments, a first pressure differential may be associated with the first line 120, and a second pressure differential may be associated with the second line 130. The withdrawn polymerization product may be conveyed to separation vessel 140 via the first pressure different and second pressure differential, with the withdrawn polymerization product flowing through the first pressure differential before flowing through the second pressure differential.

The first pressure differential of first line 120 may be characterized by a difference in pressure (e.g., a drop in pressure) between $P_0$ and $P_1$, and the second pressure differential of the second line 130 may be characterized by a difference in pressure (e.g., a drop in pressure) between $P_1$ and $P_2$. In an embodiment, the difference in pressure between $P_0$ and $P_1$ may be associated with a continuous take-off valve, as is described in detail for the embodiment of FIG. 2. In an embodiment, the difference in pressure between $P_1$ and $P_2$ may be associated with the flashline heater, as is described in detail for the embodiment of FIG. 2.

In an embodiment, the first pressure differential (e.g., a drop in pressure between $P_0$ and $P_1$) of the first line 120 may be less than the second pressure differential (e.g., a drop in pressure between $P_1$ and $P_2$) of the second line 130. In an embodiment, the first pressure differential may have a drop in pressure between about 5% to about 50% of a total pressure differential (e.g., the sum of the first pressure differential and the second pressure differential) between the loop polymerization reactor 110 and the separation vessel 140, and the second pressure differential may have a drop in pressure between about 50% to about 95% of the total pressure differential between the loop polymerization reactor 110 and the separation vessel 140. In an alternative embodiment, the first pressure differential may have a drop in pressure greater than about 40% and less than about 50% of a total pressure differential between the loop polymerization reactor 110 and the separation vessel 140, and the second pressure differential may have a drop in pressure greater than about 50% and less than about 60% of the total pressure differential between the loop polymerization reactor 110 and the separation vessel 140. In an alternative embodiment, the first pressure differential may have a drop in pressure greater than about 40% and less than about 45% of a total pressure differential between the loop polymerization reactor 110 and the separation vessel 140, and the second pressure differential may have a drop in pressure greater than about 55% and less than 60% of the total pressure differential between the loop polymerization reactor 110 and the separation vessel 140.

In an embodiment, the first pressure differential (e.g., a drop in pressure between $P_0$ and $P_1$) of the first line 120 may be greater than the second pressure differential (e.g., a drop in pressure between $P_1$ and $P_2$) of the second line 130. In an embodiment, the first pressure differential may have a drop in pressure between about 50% to about 95% of a total pressure differential (e.g., the sum of the first pressure differential and the second pressure differential) between the loop polymerization reactor 110 and the separation vessel 140, and the second pressure differential may have a drop in pressure between about 5% to about 50% of the total pressure differential between the loop polymerization reactor 110 and the separation vessel 140. In an alternative embodiment, the first pressure differential may have a drop in pressure greater than about 50% and less than about 60% of a total pressure differential between the loop polymerization reactor 110 and the separation vessel 140, and the second pressure differential may have a drop in pressure greater than about 40% and less than about 50% of the total pressure differential between the loop polymerization reactor 110 and the separation vessel 140. In an alternative embodiment, the first pressure differential may have a drop in pressure greater than about 55% and less than about 60% of a total pressure differential between the loop polymerization reactor 110 and the separation vessel 140, and the second pressure differential may have a drop in pressure greater than about 40% and less than 45% of the total pressure differential between the loop polymerization reactor 110 and the separation vessel 140.

In an embodiment, the drop in pressure of the first pressure differential is from a pressure (e.g., less than 1,000 psig) of the loop slurry polymerization reactor 110 to a pressure less than the pressure of the loop slurry polymerization reactor 110. In embodiments, the first pressure differential of the first line 120 may be configured such that the second pressure differential of the second line 130 may be maintained above a minimum value. In an embodiment, the second pressure differential may be adequate such that an inner diameter of the second line 130 may be increased at least once along the second line 130.

In an embodiment, polymer product withdrawn from the loop slurry polymerization reactor 110 may convey through the first line 120 and second line 130 via the total pressure differential (i.e., the sum of the first and second pressure differentials) between the operating pressure of the loop slurry polymerization reactor 110 and the separation vessel 140. In an embodiment, the polymerization product (e.g., polymerization product slurry, mixture, or combinations thereof) may convey through the first line 120 (e.g., comprising a continuous take-off valve, as described in detail for the embodiment in FIG. 2) to yield an at least partial gas phase mixture (e.g., mixture of gas phase diluent and/or unreacted monomer/comonomer and solid polymer). For example, the polymerization product slurry may be conveyed through the first line 120 comprising a continuous take-off valve to yield a mixture (e.g., a gas phase mixture) comprising a vapor phase, or gas phase, which exits the continuous take-off valve. The vapor phase of the mixture may comprise greater than about 0%, 1%, 2%, 3%, 4%, 5%, or more by weight of the mixture in the first line 120 (e.g., the mixture which exits the continuous take-off valve of the first line 120). Further, the concentration of the vapor phase of the mixture exiting the continuous take-of valve may increase as the mixture is conveyed through the remainder of the first line 120 and subsequently through the second line 130.

In an embodiment, a valve is present at the interface between the first line 120 and the second line 130. In alternative embodiments, the polymerization product may convey through the first line 120 and into the second line 130, where an at least partial gas phase mixture is yielded in the second line 130 (e.g., via a flashline heater, as described in detail for the embodiment in FIG. 2). The position of the separation vessel 140 relative to the loop slurry polymerization reactor 110 may be adjusted in order to transfer withdrawn polymer product via the total pressure differential, for example, to minimize or reduce the equipment dedicated to polymer product conveyance, to volatilize all liquid in the polymer product, or combinations thereof. In an embodiment, the total pressure differential is the sole means for conveying polymer product between the loop slurry polymerization reactor 110 and separation vessel 140.

The size of the total pressure differential may impact the distance the polymer may be transferred between the loop slurry polymerization reactor 110 and separation vessel 140. In an embodiment, the total pressure differential may comprises a drop in pressure from equal to or less to about 1,500 psig in the reactor 110 to equal to or greater than about 50 psig in the separation vessel 140; alternatively, a drop from equal to or less than about 1,000 psig to equal to or greater than about 100 psig; alternatively, a drop from equal to or less than about 650 psig to greater than or equal to about 135 psig. In an embodiment, the solid polymer comprises polyethylene, the diluent comprises isobutane, and the total pressure differential comprises a drop in pressure from about 650 psig to about 150 psig. In an embodiment, the solid polymer comprises polypropylene, the diluent comprises isobutane, and the total pressure differential comprises a drop in pressure from about 650 psig to about 225 psig, alternatively, from about 650 psig to about 240 psig. System capacity also impacts the ability of the total pressure differential to transfer pounds of polymer over a distance per year. In an embodiment, the total pressure differential may transfer from about 100 million to about 2 billion pounds per year; alternatively, from about 500 million to about 1.8 billion pounds per year; alternatively, from about 1 to about 1.5 billion pounds per year.

The first and second pressure differentials of the first line 120 and second line 130 may convey or transfer the polymerization product through the first line 120 and second line 130 at one or more velocities. For example, the polymerization product may transfer through the first line 120 and/or the second line 130 at a velocity (e.g., an average velocity) of between about 25 ft/s (about 7.6 m/s) and about 270 ft/s (about 82.4 m/s). In embodiments, the velocity of the polymerization product through the first line 120 is different than the velocity of the polymerization product through the second line 130. In embodiments, the polymerization product may experience more than one velocity (e.g., before a continuous take-off valve, through a continuous take-off valve, and after a continuous take-off valve) as the polymerization product transfers through the first line 120. In embodiments, the polymerization product may experience more than one velocity (e.g., different velocities for one or more segments of a flashline heater, as described in FIGS. 2 and 3) as the polymerization product transfers through the second line 130. In an embodiment, the polymerization product (e.g., polymerization product slurry, product mixture, or combinations thereof) may be conveyed through the first line 120, the second line 130, or both, such that the polymerization product (e.g., polymerization product slurry, product mixture, or combinations thereof) has a Froude number (discussed in detail for the embodiment in FIG. 2) at one or more points in the first line 120, second line 130, or both, in a range from about 5 to about 100.

The first and second pressure differentials of the first and second lines 120 and 130 may generate a cooling effect on the polymerization product which may counteract a desired volatization of liquid in the polymerization product. In an embodiment, polymerization product in the first line 120, second line 130, or both, may be heated to maintain or raise the temperature of the polymer product during transfer therethrough. In an embodiment, a flashline heater, e.g., steam or hot water jackets, (discussed in detail for the embodiments shown in FIGS. 2 and 3) may heat of the first line 120, second line 130, or both. The heating may be controlled so that it does not cause the polymer product to reach the melting or softening temperature. In an embodiment, the solid polymer comprises polyethylene and the heating results in a solid polymer temperature of greater than or equal to about 0° F. and less than or equal to about 230° F.; alternatively, greater than or equal to about 0° F. and less than or equal to about 180° F. In an embodiment, the solid polymer comprises polypropylene and the heating results in a solid polymer temperature of greater than or equal to about 0° F. and less than or equal to about 250° F.; alternatively, greater than or equal to about 0° F. and less than or equal to about 220° F.; alternatively, greater than or equal to about 0° F. and less than or equal to about 170° F.

In embodiments, the first pressure differential of the first line 120, the second pressure of the second line 130, the heating of the first line 120, the heating of the second line 130, or combinations thereof may vaporize a substantial amount (e.g., at least about 50%, 75%, 90%, 95%, 99%, 99.5% or more) of the liquid in the polymerization product prior to delivery to the separation vessel 140. In alternative embodiments, the first pressure differential of the first line 120, the second pressure of the second line 130, the heating of the second line 130, or combinations thereof may vaporize substantially all (e.g., at least about 99%, 99.9%, 99.99%, 99.999%, or 100% by weight volatized) of the liquid in the polymerization product prior to delivery to the separation vessel 140.

A separation vessel 140 may recover solid polymer which is received from the second line 130. In one or more of the embodiments disclosed herein, the polymerization product flowing from the second line 130 (for example, a mixture of solid polymer and at least a portion, substantially all or all of the other components, e.g., diluent and/or unreacted monomer/comonomer, are in a gas phase) may be separated into solid polymer in line 144 and one or more gases in line 142 in separation vessel 140.

Any suitable technique may be used to separate the polymerization product into solid polymer and gases. For example, the separation vessel 140 may comprise a vapor-liquid separator. Suitable embodiments of a vapor-liquid separator may include a distillation column, a flash tank, a filter, a membrane, a reactor, an absorbent, an adsorbent, a molecular sieve, a cyclone, or combinations thereof. In an embodiment, the separator comprises a flash tank. Not seeking to be bound by theory, such a flash tank may comprise a vessel configured to vaporize and/or remove low vapor pressure components from a high temperature and/or high pressure fluid.

In an embodiment, the separation vessel 140 may be configured such that polymerization product from second line 130 may be separated into solid and liquid (e.g., a condensate) phase components in line 144 and a gas (e.g., vapor) phase components in line 142. The liquid or condensate may comprise solid polymer (e.g., polyethylene) and any liquid phase components such as diluent and/or unreacted monomer/comonomer, and in some embodiments line 144 is a concentrated slurry in comparison to the product slurry in lines 120 and 130. The gas or vapor may comprise volatile solvents, diluent, unreacted monomers and/or optional comonomers, waste gases (e.g., secondary reaction products, such as contaminants and the like), or combinations thereof. The separations vessel 140 may be configured such that the polymerization product flowing from the second line 130 is flashed by heat, pressure reduction, or combinations thereof such that the enthalpy of the line is increased. This may be accomplished via a heater, a flashline heater, various other operations commonly known in the art, or combinations thereof. For example, a flash line heater comprising a double pipe may exchange heat by hot water or steam. Such a flashline heater may increase the temperature of the second line 130 while reducing its pressure.

In an alternative embodiment, the separation vessel 140 may be configured such that polymerization product from second line 130 may be separated into solid polymer in line 144 substantially or completely free of any liquid phase components and one or more gases in line 142. Suitable separation techniques include distilling, vaporizing, flashing, filtering, membrane screening, absorbing, adsorbing, cycloning, gravity settling, or combinations thereof, the polymerization product received in separation vessel 140 from the second line 130.

In an embodiment, the separation vessel 140 may operate at a pressure of from about 50 psig to about 500 psig; alternatively, from about 130 psig to about 190 psig; alternatively, at about 135 psig.

In one or more embodiments, the gas in line 142 may comprise hydrogen, nitrogen, methane, ethylene, ethane, propylene, propane, butane, isobutane, pentane, hexane, hexene-1 and heavier hydrocarbons. In an embodiment, ethylene may be present in a range of from about 0.1% to about 15%, alternatively, from about 1.5% to about 5%, alternatively, about 2% to about 4% by total weight of the line. Ethane may be present in a range of from about 0.001% to about 4%, alternatively, from about 0.2% to about 0.5% by total weight of the line. Isobutane may be present in a range from about 80% to about 98%, alternatively, from about 92% to about 96%, alternatively, about 95% by total weight of the line.

The separation vessel 140 may additionally comprise any equipment associated with the separation vessel 140, such as control devices (e.g., a PID controller) and measurement instruments (e.g., thermocouples), and level control and measurement devices.

In an embodiment, the horizontal distance between the separation vessel 140 and the loop slurry polymerization reactor 110 may be adjusted to optimize layout and cost. In an embodiment, the first and second pressure differentials transfer the polymer product to separation vessel 140 which may be from about 0 to about 3,000 horizontal feet from the loop slurry polymerization reactor 110; alternatively, the separation vessel 140 may be from about 0 to about 1,500 horizontal feet from the loop slurry polymerization reactor 110; alternatively, the separation vessel 140 may be from about 100 to about 1,500 horizontal feet from the reactor 110; alternatively, the separation vessel 140 may be from about 100 to about 500 horizontal feet from the reactor 110; alternatively, the separation vessel 140 may be from about 200 to about 500 horizontal feet from the reactor 110. In various embodiments, the polymer product may travel a linear distance through first line 120 and second 130 in x, y, and z coordinates, for example through circuitous pipe routing, that is greater than the horizontal distance, the vertical spacing/distance, or combinations thereof.

Figure 2:
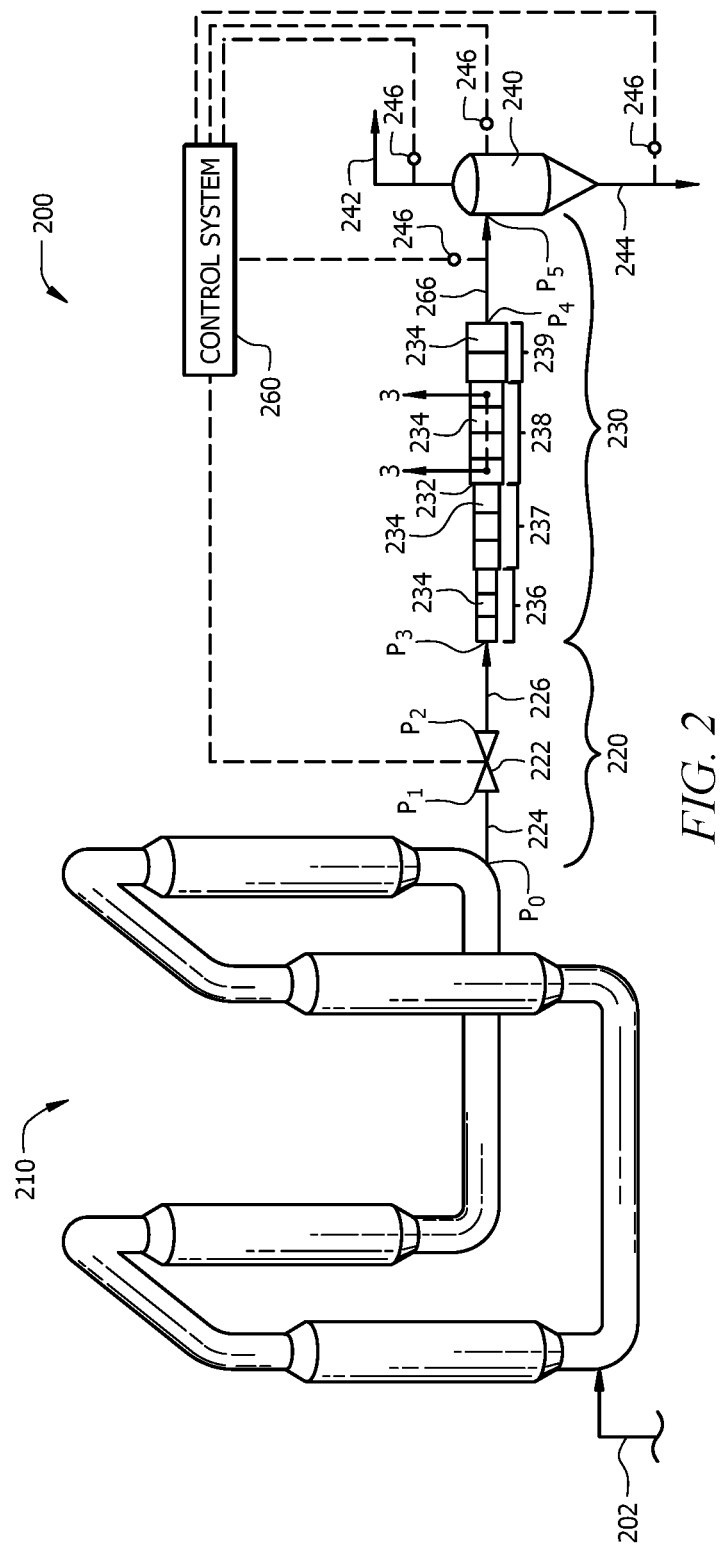
FIG. 2 shows a process flow diagram of another embodiment of a system for pressure management of a polymerization product in a loop polymerization process.

FIG. 2 shows a process flow diagram of another embodiment of a system 200 for pressure management of a polymerization product in a loop polymerization process. Similar to the embodiment of the system 100 of FIG. 1, system 200 may comprise a loop slurry polymerization reactor 210, a first line 220, a second line 230, and a separation vessel 240, which share the same qualities as those described above for the loop slurry polymerization reactor 110, first line 120, second line 130, and separation vessel 140 of FIG. 1, except where explained below in the alternative.

In embodiments such as that shown in FIG. 2, the first line 220 of the system 200 may comprise a continuous take-off valve (hereinafter "CTO valve") 222. In embodiments, various lines may be used to connect the CTO valve 222 in the first line 220. For example, line 224 may connect the CTO valve 222 with the loop slurry polymerization reactor 210, and line 226 may connect the CTO valve 222 with the second line 230 (e.g., with the flashline heater 232). In alternative or additional embodiments, the CTO valve 222 may connect directly or indirectly to the loop slurry polymerization reactor 210. In alternative or additional embodiments, the CTO valve 222 may connect directly or indirectly to the flashline heater 232. In embodiments, the CTO valve 222 may have a diameter of about 1 inch to about 8 inches.

In embodiments such as that shown in FIG. 2, the second line 230 may comprise a flashline heater 232. In embodiments, various lines may be used to connect the flashline heater 232 in the second line 230. For example, the flashline heater 232 may connect directly to the first line 220, and line 266 may connect the flashline heater 232 to the separation vessel 240. In alternative or additional embodiments, the flashline heater 232 may connect directly or indirectly to the first line 220. In alternative or additional embodiments, the flashline heater 232 may connect directly or indirectly to the separation vessel 240.

As with the embodiment shown in FIG. 1, the system 200 of FIG. 2 may have a first pressure differential and a second pressure differential. The first pressure differential may be associated with the first line 220 comprising the CTO valve 222, and the second pressure differential may be associated with the second line 230 comprising the flashline heater 232.

In FIG. 2, the first pressure differential of first line 220 may be characterized by a difference in pressures between any two pressures $P_0$, $P_1$, $P_2$, and $P_3$. In an embodiment, the difference in pressures between any two pressures $P_0$, $P_1$, $P_2$, and $P_3$ may be characterized as a drop in pressure. In an embodiment, the difference in pressures between $P_1$ and $P_2$ may be associated with the CTO valve 222. In an embodiment, the difference in pressures associated with the CTO valve 222 may depend on the position (e.g., valve rotation) of the valve, i.e., the degree by which the CTO valve 222 is open. For example, the CTO valve 222 may have a valve rotation of about 5°, 10°, 20°, 30°, 40°, 50°, 60°, 70°, 80°, 90°, or more.

The second pressure differential of second line 230 may be characterized by a difference in pressures between any two pressures $P_3$, $P_4$, and $P_5$. In an embodiment, the difference in pressures between any two pressures $P_3$, $P_4$, and $P_5$ may be characterized as a drop in pressure. In an embodiment, the difference in pressures between $P_3$ and $P_4$ may be associated with the flashline heater 232.

In an embodiment, the difference in pressure between $P_1$ and $P_2$ may comprise a majority of the first pressure differential of first line 220. In an additional or alternative embodiment, the difference in pressure between $P_0$ and $P_2$ may comprise a majority of the first pressure differential of first line 220. In an additional or alternative embodiment, the difference in pressure between $P_1$ and $P_3$ may comprise a majority of the first pressure differential of first line 220. In an embodiment, the difference in pressure between $P_3$ and $P_4$ may comprise a majority of the second pressure differential of second line 230. In an additional or alternative embodiment, the difference in pressure between $P_3$ and $P_5$ may comprise a majority of the second pressure differential of second line 230. In an additional or alternative embodiment, the difference in pressure between $P_4$ and $P_5$ may comprise a majority of the second pressure differential of second line 230.

In an embodiment, the system 200 may further comprise a control system 260 for controlling the withdrawal of polymer product from the loop slurry polymerization reactor 210. The control system 260 may control, for example, the CTO valve 222 and/or control and/or measurement instruments for the loop slurry polymerization reactor 220 (e.g., sensors of weight percent solids, reactor pressure, supply of feed, fluidized bed height, etc., or combinations thereof). The control system 260 may additionally or alternatively monitor and maintain the amount of polymer product in the loop slurry polymerization reactor 210 by controlling the flow of polymerization product from the reactor 210 to the separation vessel 260 via the first line 220 and second line 230. The control system 260 may additionally or alternatively monitor line conditions with sensors 246, e.g., for lines 266, 242, and 244. The control system 260 may additionally or alternatively monitor and maintain the level of solid polymer in the separation vessel 240, for example via one or more sensors 246. In an embodiment, the control system 260 may adjust a flow of polymer product in the first line 220 and/or second line 230 via adjustment of the CTO valve 222.

In an embodiment, the CTO valve 222 may comprise a solids-tolerant valve. In alternative embodiments, the CTO valve 222 may comprise a plug valve, or a ball valve, such as a Vee-B all valve. The CTO valve 222 may have a flow coefficient, $C_v$. The $C_v$ of the CTO valve 222 may be matched such that a drop in pressure in the flashline heater 232 is maximized. In an embodiment, a drop in pressure of the flashline heater 232 is adequate to increase an inner diameter of the flashline heater 232 at least once, i.e., the flashline heater 232 may have at least two inner diameters. Generally, the longer the total length of the flashline heater 232, the larger the value of the $C_v$ of the CTO valve 222. Generally, the higher the production rate of solid polymer the larger the total length may be required for the flashline heater 232. Generally, the lower the density of the solid polymer the larger the total length may be required for the flashline heater 232. In an embodiment, the $C_v$ of the CTO valve 222 is matched to maximize vaporization of liquids in the flashline heater 232. For example, a CTO valve 222 having a valve size of one inch may have a $C_v$ in a range of about 0.0401 corresponding to a valve rotation of about 10° to about 32.1 corresponding to a valve rotation of about 90°; alternatively, a CTO valve 222 having a valve size of 1.5 inches may have a $C_v$ in a range of about 0.288 corresponding to a valve rotation of about 10° to about 72.1 corresponding to a valve rotation of about 90°; alternatively, a CTO valve 222 having a valve size of two inches may have a $C_v$ in a range of about 0.158 corresponding to a valve rotation of about 10° to about 125 corresponding to a valve rotation of about 90°; and so on.

As shown in FIG. 2, the flashline heater 232 may comprise a plurality of segments 234 connected in series. One or more of the plurality of segments 234 of the flashline heater 232 may comprise a segment set. In embodiments, a segment set may comprise a group of the segments 234 of the flashline heater 232 which are connected in series and which may share a common parameter such as inner diameter, whether the segments are heated, or combinations thereof; alternatively, a single segment of the plurality of segments 234 may comprise a segment set which has a parameter different than other segments and/or segment sets. For example, Table 2 shows data for the flashline heater of Example 1 having twenty-nine segments, where segment set 1 comprises segments 1 to 6 (which are not heated), segment set 2 comprises segments 7 to 26 (which are heated) and segment set 3 comprises segments 27 to 29 (which are not heated). As another example, Table 4 shows data for a flashline heater of Example 2 having 29 segments, where segment set 1 comprises segments 1 to 6 (which are not heated and have an inner diameter of 2.067 inches), segment set 2 comprises segments 7 to 14 (which are heated and have an inner diameter of 2.469 inches), segment set 3 comprises segments 15 to 21 (which are heated and have an inner diameter of 3.068 inches), segment set 4 comprises segments 22 to 26 (which are heated and have an inner diameter of 4.026 inches), and segment set 5 comprises segments 27 to 29 (which are not heated and have an inner diameter of 4.026 inches). In additional or alternative embodiments, the common parameter of segments in a segment set may comprise outer diameter, segment length, segment material, or combinations thereof. In other embodiments, segment sets may be determined by inner diameter only; alternatively, outer diameter only, alternatively, segment length only.

The flashline heater 232 may be generally sized and configured to receive polymerization product from the first line 230 and vaporize at least a portion of the liquid in the polymerization product (e.g., liquid of polymerization product slurry) to convert at least a portion of the polymerization product to a polymer solids and gas phase mixture. In an embodiment, a liquid of the polymerization product may comprise a first portion not entrained within solid polymer and a second portion entrained within the solid polymer. In embodiments, the flashline heater 332 may vaporize substantially all (e.g., at least about 99%, 99.9%, 99.99%, 99.999%, or 100% by weight volatized) of the first portion of the liquid (i.e., the portion not entrained within the solid polymer) in the polymerization product prior to delivery to the separation vessel 240. In embodiments, the flashline heater 332 may vaporize a substantial amount (e.g., at least about 75%, 90%, 95%, 99%, 99.5% or more) of the second portion of the liquid (i.e., the portion entrained within the solid polymer) in the polymerization product prior to delivery to the separation vessel 240.

Generally, the flashline heater 232 may be configured such that the travel time of the solid polymer through the flashline heater 232 is at least or greater than about 7.5 seconds; alternatively, greater than about 8 second; alternatively, greater than about 8.5 seconds; alternatively, greater than about 9 seconds; alternatively, greater than about 9.5 seconds; alternatively, greater than about 10 seconds; alternatively, greater than about 10.5 seconds; alternatively, greater than about 11 seconds. In embodiments, the flashline heater 232 may be configured such that the travel time of the solid polymer through the flashline heater 232 is about 7.5, 8, 8.5, 9, 9.5, 10, 10.5, 11, 11.5, or more seconds. As the polymerization product flows through the flashline heater 232, the temperature of its various components may approach equilibration. For example, the temperature between the vaporized first portion of the liquid, the solid polymer, and the second portion of the liquid may become substantially equilibrated or have a temperature difference of less than about 10° F.

Generally, at least one of the segments 234 may have an inner diameter greater than an inner diameter of a preceding segment. In an embodiment, at least one of the segments 234 may have an inner diameter greater than a diameter of the CTO valve 222. The inner diameters of the segments 234 may increase along the length of the flashline heater 232 as shown in FIG. 2. For example, segments of segment set 237 have an inner diameter greater than preceding segments of segment set 236, segments of segment set 238 have an inner diameter greater than preceding segments of segment sets 237 and 236, and segments of segment set 239 have an inner diameter greater than preceding segments of segment sets 238, 237, and 236. In embodiments, the flashline heater 232 may have an inner diameter of about 2 inches to about 10 inches. In embodiments, the segments 234 may have an inner diameter of about 2 inches to about 10 inches. In embodiments, each of the segments 234 may have an outer diameter between about 4 and about 16 inches (e.g., about 4 inches, 5 inches, 6 inches, 7 inches, 8 inches, inches, 9 inches, 10 inches, 11 inches, 12 inches, 13 inches, 14 inches, 15 inches, or 16 inches). Further, the segments 234 may each have a length that is between about 5 feet and about 100 feet (e.g., about 10 feet, 15 feet, 20 feet, 25 feet, 30 feet, 35 feet, 40 feet or greater). Each of segments 234 may have the same or different length as other segments, and the length of each segment 234 may depend on the particular number of segments 234 employed and the total length of the flashline heater 232 in a given implementation. The flashline heater 232 may have a total length greater than about 100 feet; alternatively, greater than about 200 feet; alternatively, greater than about 300 feet; alternatively, greater than about 400 feet; alternatively, greater than about 500 feet; alternatively, greater than about 600 feet; alternatively, greater than about 700. In an embodiment, the flashline heater 232 may have a total length of about 560 feet; alternatively, about 630 feet; alternatively, about 700 feet. In embodiments, the flashline heater 232 may have a length and one or more inner diameters such that the flashline heater 232 provides the polymerization product (e.g., polymerization product slurry, product mixture, or combinations thereof) a residence time of at least or greater than about 7.5; alternatively, greater than about 8 second; alternatively, greater than about 8.5 seconds; alternatively, greater than about 9 seconds; alternatively, greater than about 9.5 seconds; alternatively, greater than about 10 seconds; alternatively, greater than about 10.5 seconds; alternatively, greater than about 11 seconds. In embodiments, the flashline heater 232 may have a length and one or more inner diameters such that the flashline heater 232 provides the polymerization product a residence time of about 7.5, 8, 8.5, 9, 9.5, 10, 10.5, 11, 11.5, or more seconds.

In embodiments where a polymerization product is conveyed through at least a portion of the flashline heater 232 (e.g., a segment 234, a portion of a segment 234, two or more segments, a segment set, a portion of a segment set, or combinations thereof), the product stream may have a Froude number in a range from about 5 to about 100; alternatively, from about 10 to about 55; alternatively, from about 10 to about 50; alternatively, from about 15 to about 55; alternatively, from about 20 to about 70; alternatively, from about 20 to about 40; alternatively, from about 15 to about 30. The Froude number as used herein is defined as a dimensionless parameter indicative of the balance between the suspension and settling tendencies of particles in the polymerization product, e.g., the polymerization product slurry. It provides a relative measure of the momentum transfer process to the pipe wall from particles compared to the fluid. Lower values of the Froude number indicate stronger particle-wall (relative to fluid-wall) interactions. The Froude number (Fr) may be defined using the following equation:

$$Fr=V/(D*g)^{0.5}$$

where V is the average velocity (units of ft/s) of the polymerization product (e.g., polymerization product slurry, solid/gas phase mixture, combinations thereof, or components thereof), g is the gravitational constant (32.2 ft/s$^2$), and D is the internal pipe diameter (units of ft). The Froude number may be used to describe at least a portion of the polymerization product in at least a portion a segment of the flashline heater 232, in a combination of segments of the flashline heater 232, in segment sets, combinations thereof, or across the entire flashline heater 232.

In embodiments, the average velocity in stream 230 may be in a range of about 25 ft/s (about 7.6 m/s) to about 270 ft/s (about 82.4 m/s); alternatively, in a range of about 40 ft/s (about 12.2 m/s) to about 160 ft/s (about 48.8 m/s). In an embodiment, the velocity of the polymerization product may be below a sonic velocity of the polymer product.

Figure 3:
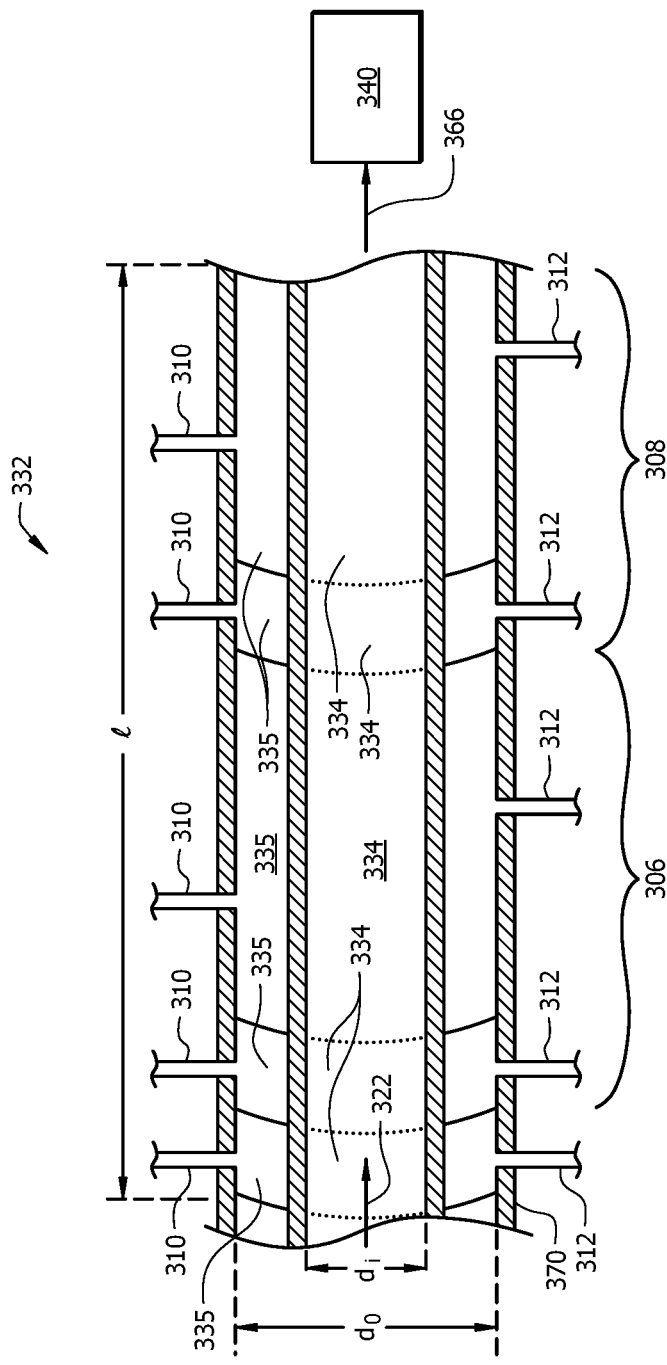
FIG. 3 shows a cross-sectional view of an embodiment of a portion of the flashline heater, taken along sight line 3-3 of FIG. 2.

FIG. 3 shows a cross-sectional view of an embodiment of a portion of the flashline heater 332, taken along sight line 3-3 of FIG. 2. The portion of the flashline heater 332 has length "l". As shown in FIG. 3, a polymerization product 322 may enter the portion of the flashline heater 332. At least a portion of the liquid components in polymerization product 322 may convert to gas phase, thereby yielding a mixed phase product stream 366 (e.g., polymer solids, gas phase components, and in some instances, remaining liquid components) which exits the portion of the flashline heater 332. The characteristics (e.g., amount of gas and/or liquid phase of various components) of the product stream 366 delivered to the separation vessel 340 may depend on many factors including but not limited to a length "l" of the portion of the flashline heater 332, a diameter "$d_o$" of an outer conduit 370 of the flashline heater 332, an internal diameter "$d_i$" of the segments 334 of the flashline heater 332, the velocity of the product stream in the flashline heater 332, the velocity of the polymerization product in the flashline heater 332 in relation to the take-off velocity of the polymerization product 322, the chemical nature of the components within the polymerization product 322, the amount of flash occurring upstream from the flashline heater 332 (e.g., in CTO valve 222), or combinations thereof.

To affect the volatilization of the liquid within the polymerization product 322, the flashline heater 332 may also include a plurality of segments 335 forming an outer conduit 370, which may wrap around at least a portion of one or more of the segments 334. The segments 335 may be configured to facilitate a flow of a warming medium through a portion or the entire outer conduit 370. The segments 335 may have the same or differing diameters and/or lengths as one another. In embodiments, the segments 335 may have correspondingly same or differing diameters and/or lengths as the segments 334 which they wrap around.

In an embodiment, the warming medium that flows through the segments 335 may allow the flashline heater 332 to heat the polymerization product 322 through, for example, length l, one or more sections (e.g., segment sets—contiguous or non-contiguous) of the flashline heater 332, or throughout the entire length of the flashline heater 332. That is, the segments 335 of the flashline heater 332 may increase, decrease, or maintain the temperature of the polymerization product 322 as it flows through segments 334, which may allow for control of the heating rate and/or resulting temperature of the solid polymer as the polymerization product 322 flows through the flashline heater 332, as portions of the liquid components of the polymerization product 322 convert to gas phase, as the mixed phase product stream 366 exits the flashline 332, or combinations thereof. During operation, the warming medium may flow through one or more segments 335 of the outer conduit 370, which indirectly heats the polymerization product 322 as the polymerization product 322 flows through the segments 334. In other words, the warming medium flowing through one segment 335 may be substantially separated from the warming medium flowing through another segment 335, such that each segment 335 may be separated from the other, thereby allowing independent control of heating across one or more segments. Alternatively or additionally, two or more segments 335 may share a flow of warming medium. For example, the two or more segments 335 may share a single inlet and outlet. In some embodiments, the warming medium may be warmed coolant from the cooling jackets of the polymerization reactor (e.g., jackets 113 of FIG. 1), steam or steam condensate, hot oil, another heating source such as heat generated by electrical resistance heaters, or combinations thereof.

In embodiments, the flashline heater 332 may allow warming medium to flow through any one or a combination of the segments 335. For example, the heating medium may flow through a first set 306 of segments 335 but not through a second set 308 of segments 335, or any similar flow or temperature scheme, such as through every third segment, or through three segments and not through a fourth, and so on. For example, in the illustrated embodiment, the warming medium may flow into a respective inlet 310 and out of a respective outlet 312 of each one of the segments 335. Alternatively, combinations of segments 335 may have a common inlet and/or a common outlet. In one implementation, when the warming medium flows through the first set 306 of segments 335 but not the second set 308, it may initially warm the polymerization product 322 such that substantially all of the liquid within the polymerization product 322 is vaporized, followed by a period of cooling or temperature maintenance. Whether the second set 308 of segments 335 may be used to provide heat may depend on the measured levels of liquid (e.g., diluent) entrained within the solid polymer, the desired specifications of the solid polymer, desired solid polymer temperature, or combinations thereof. However, it should be noted that, in embodiments where the flashline heater 332 is configured to substantially continuously heat the polymerization product 322 along a length of greater than about 700 feet, the solid polymer may begin to melt, which may cause difficulty in further processing. By controlling the amount of warming fluid flowing through each segment 335 or combination of segment sets (such as 306 and 308), an operator and/or controller may be able to adjust the temperature of the polymerization product to a desired level. In one embodiment, the temperature difference between the vapor and solid polymer in the polymer product stream 366 exiting the flashline heater 332 may be substantially negligible or the temperature of the solid polymer may approach about within 40° F., 20° F., 10° F., 5° F., or 1° F. of the temperature of the vapor. Further, the polymer product stream 366 may approach a thermal equilibrium, such that substantially all of the liquid present (e.g., liquid entrained in the solid polymer), the vapor and the solid polymer each have a temperature that differ from one another by no more than 1° F.

In an embodiment, the flashline heater 332 may reduce a boiling point of liquid in the polymerization product at a given pressure. In such an embodiment, the liquid may more readily volatize in the flashline heater 332.

In additional or alternative embodiments, the volatilization and/or thermal equilibrium may at least partially depend on the total length of the flashline heater 332. For example, the total length of the flashline heater 332 may at least partially determine the temperature of the product stream 366 as well as the extent of entrained liquid remaining within the solid polymer. In a general sense, the total length of the flashline heater 332 may at least partially determine how much time the polymerization product may spend in heated areas, in cooled areas, in areas of high and/or low pressure, and so on. In this way, the total length of the flashline heater 332 may at least partially determine the amount of time between full vaporization of liquids not associated or entrained within the solid polymer of the polymerization product 322 and the delivery of the product stream 366 exiting the flashline heater to the separation vessel 340. Therefore, it should be noted that in some configurations, such as those with a substantially constant diameter and temperature, that as the total length of the flashline heater 332 increases, so may the transit time of the polymerization product 322 through the flashline heater 332 and the likelihood that the first portion of liquid is completely volatized and the second portion of liquid has been substantially volatilized.

While the total length of the flashline heater 332 may at least partially determine the transit time of the polymerization product 322, the diameters $d_i$ and $d_o$ may at least partially determine the rate at which the liquids within the polymerization product 322 volatilize. Therefore, the total length and diameters $d_i$ and $d_o$ of the flashline heater 332 may have a synergistic effect in determining the characteristics of the product stream 366 exiting the flashline heater and delivered to the separation vessel 340. Therefore, it should be noted that an increase in both the total length and the internal diameter $d_i$ relative to conventional dimensions may greatly increase the probability of full vaporization of liquids and/or temperature equilibration for the vapor, liquids, solid polymer, or combinations thereof.

In embodiments, the inner diameter $d_i$ of segments 334 may change along the length of the flashline heater 332. Therefore, the polymerization product 322 may experience changing pressure proportional to the diameter change as it progresses through the flashline heater 332. Temperature and/or pressure changes may be substantially static (e.g., unchanging throughout the total length of the flashline heater 332 in time) or may be dynamic (e.g., changing throughout the total length of the flashline heater 332 in time). That is, the segments 334 may have different or the same heating temperatures, different or the same pressures, or any combination of these. The first portion of the liquid of the polymerization product 322 (the portion not entrained within the solid polymer) may be substantially totally volatilized (e.g., at least about 99%, 99.9%, 99.99%, 99.999%, or 100% by weight volatized) with sufficient remaining transit time to allow the second portion to substantially volatilize (e.g., at least about 75%, 90%, 95%, 99%, or 99.5% by weight of the second portion of liquid is volatilized), or at least to reach a thermal equilibrium with the solid polymer and vapor within the product stream 366 exiting the flashline heater 332. Again, when the phases of the product stream 366 have reached thermal equilibrium, the phases will differ in temperature by no more than about 1° F.

To reach substantial vaporization and/or thermal equilibrium, in accordance with present embodiments, the polymerization product 322 may flow through the flashline heater 332 through the segments 334 having internal diameter $d_i$. Substantially concurrently, the polymerization product 322 is heated by a warming fluid within the outer conduit 370 having the diameter $d_o$, which may surrounds at least a portion of one or more of segments 334. According to the present approaches, either or both of these diameters may impact the rate at which liquids within the polymerization product 322 volatilize. For example, in some embodiments, the inner diameter $d_i$ may be inversely proportional to the pressure within the flashline heater 332. That is, as the diameter $d_i$ increases, the pressure acting on the polymerization product 322 may decrease, which may allow an increased rate of volatilization of the liquids. Also, as the $d_i$ increases, the velocity decreases and provides additional residence time for volatization. Accordingly, in some embodiments, the internal diameter $d_i$ of the segments 334 is increased relative to conventional designs, such as to diameters of at least 2, 3, 4, 5, 6, 7, or 8 inches, or more.

An increase in the diameter $d_o$ may also increase the rate of volatilization of the liquids within the polymerization product 322. For example, the diameter $d_o$ may define the amount of warming fluid available to the outer surface of the segments 334 for indirectly heating the polymerization product 322. While the exchange of heat between the warming medium and the polymerization product 322 may be substantially limited by the outer and inner surface areas of the segments 334, it should be noted that as the diameter $d_o$ of the outer conduit 370 increases, so may the amount of warming medium available for heat exchange. Accordingly, as the amount of warming medium within the outer conduit 370 increases, heat transfer to the polymerization product 322 may have a minimized impact on the average temperature of the warming medium within the outer conduit 370. Therefore, by increasing the diameter $d_o$ relative to diameter $d_i$, more efficient heating of the polymerization product 322, and therefore volatilization of the liquids within the polymerization product 322, may be realized.

It should be noted, in light of the present discussion, that the diameter $d_o$ of the outer conduit 370, the diameter $d_i$ of one or more segments 334, the total length of the flashline heater 332, and their interrelation may at least partially determine the relative times of conversion for the liquid(s) of the polymerization product 322 entering the flashline heater to convert to vapor in product stream 366 exiting the flashline heater 332.

EXAMPLES

The disclosure having been generally described, the following examples are given as particular embodiments of the disclosure and to demonstrate the practice and advantages thereof. It is understood that these examples are given by way of illustration and is not intended to limit the specification or the claims in any manner.

A computerized commercial process simulator was employed to generate data in accordance with the embodiments disclosed herein. Each of the examples below discloses data obtained by simulation of a first pressure differential and a second pressure differential according to specified operating conditions. In each of the examples, a CTO valve is associated with a first pressure differential, and a flashline heater is associated with a second pressure differential, for example, as shown in FIG. 2. Moreover, each example involves a polymerization product transferred through the first pressure differential, and portions of the liquid components of the polymerization product vaporize to gas as the polymerization product transfers through the first and second pressure differentials. Each of the examples assumes the drop in pressure of the first pressure differential is associated with the CTO valve, and any lines in the first pressure differential are isobaric. Likewise, each of the examples assumes the drop in pressure of the second pressure differential is associated with the flashline heater, and any lines in the second pressure differential are isobaric.

Example 1

The operating conditions for Example 1 are disclosed in Table 1 below. As can be seen, the operating conditions include values for the pressure differentials, the mass flow rates and composition for the polymerization product, operating conditions of the CTO valve, the steam temperature on the flashline heater, and operating conditions of the separation vessel.

TABLE 1

| | |
|---|---|
| First Pressure Differential | 226.4 psi |
| Second Pressure Differential | 247.6 psi |
| Total Pressure Differential | 474.0 psi |
| Polymerization Product | |
| Methane | 90.0 lb/hr |
| Ethylene | 3149.6 lb/hr |
| Ethane | 899.9 lb/hr |
| Propane | 180.0 lb/hr |
| Isobutane | 82070.8 lb/hr |
| Butane | 2459.8 lb/hr |
| Hexene | 1889.8 lb/hr |
| Hexane | 180.0 lb/hr |
| Solid Polymer | 85,000 lb/hr |
| Solid Polymer | 48.4 wt % |
| Continuous Take-Off (CTO) Valve | |
| Inlet Temperature | 197.6° F. |
| Outlet Temperature | 195.9° F. |
| Inlet Pressure | 615.0 psia |
| Outlet Pressure | 388.6 psia |
| Vapor Fraction | 0.0000 wt |
| Steam | |
| Temperature | 238° F. |
| Separation Vessel | |
| Pressure | 140 psia |
| Temperature | 175° F. |
| Elevation | 150 ft |

As can be seen in Table 1, the first pressure differential is less than the second pressure differential. Particularly, the first pressure differential is about 47.8% of the total pressure differential, and the second pressure differential is about 52.2% of the total pressure differential. The polymerization product entering and exiting the CTO has 0.0000 wt. % vapor fraction. The particular operating conditions of the flashline heater of Example 1 are shown in Table 2.

TABLE 2

| Segment (#) | Segment Set (#) | Segment Length (ft) | Total Length (ft) | Outlet Pressure (psia) | Drop in Pressure (psi) | Outlet Temp (° F.) | Vapor Fraction (wt) | Avg Velocity (ft/sec) | ID (in) | OD (in) | Froude No. | Heated (y/n) | Overall $U_o$ (B/hr-ft²-F.) | Duty (1k B/hr) |
|---|---|---|---|---|---|---|---|---|---|---|---|---|---|---|
| 1 | 1 | 10 | 10 | 379.7 | 8.9 | 195.8 | 0.0000 | 25.5 | 3.068 | 3.500 | 8.89 | n | 0.0 | 0.0 |
| 2 | 1 | 20 | 30 | 364.5 | 15.2 | 195.6 | 0.0000 | 25.6 | 3.068 | 3.500 | 8.92 | n | 0.0 | 0.0 |
| 3 | 1 | 20 | 50 | 349.3 | 15.2 | 195.5 | 0.0000 | 25.6 | 3.068 | 3.500 | 8.92 | n | 0.0 | 0.0 |
| 4 | 1 | 20 | 70 | 344.0 | 5.3 | 195.3 | 0.0024 | 28.2 | 3.068 | 3.500 | 9.83 | n | 0.0 | 0.0 |
| 5 | 1 | 20 | 90 | 337.6 | 6.4 | 194.4 | 0.0174 | 27.8 | 3.068 | 3.500 | 9.69 | n | 0.0 | 0.0 |
| 6 | 1 | 20 | 110 | 331.0 | 6.6 | 193.4 | 0.0334 | 29.4 | 3.068 | 3.500 | 10.25 | n | 0.0 | 0.0 |
| 7 | 2 | 20 | 130 | 326.0 | 5.0 | 193.1 | 0.0523 | 31.9 | 3.068 | 3.500 | 11.12 | y | 171.4 | 114.3 |
| 8 | 2 | 20 | 150 | 321.1 | 4.9 | 192.7 | 0.0713 | 34.4 | 3.068 | 3.500 | 11.99 | y | 164.4 | 110.5 |
| 9 | 2 | 20 | 170 | 319.0 | 2.1 | 192.8 | 0.0834 | 36.1 | 3.068 | 3.500 | 12.58 | y | 158.4 | 106.8 |
| 10 | 2 | 20 | 190 | 316.7 | 2.3 | 192.8 | 0.0960 | 37.8 | 3.068 | 3.500 | 13.17 | y | 154.9 | 104.3 |
| 11 | 2 | 20 | 210 | 314.3 | 2.4 | 192.7 | 0.1089 | 39.6 | 3.068 | 3.500 | 13.80 | y | 151.4 | 102.0 |
| 12 | 2 | 20 | 230 | 311.8 | 2.5 | 192.6 | 0.0122 | 41.5 | 3.068 | 3.500 | 14.46 | y | 148.0 | 99.8 |
| 13 | 2 | 20 | 250 | 309.0 | 2.8 | 192.5 | 0.1365 | 43.4 | 3.068 | 3.500 | 15.13 | y | 144.5 | 97.8 |
| 14 | 2 | 20 | 270 | 303.9 | 5.1 | 191.8 | 0.1574 | 46.5 | 3.068 | 3.500 | 16.21 | y | 148.6 | 101.4 |
| 15 | 2 | 20 | 290 | 300.6 | 3.3 | 191.6 | 0.1743 | 49.0 | 3.068 | 3.500 | 17.08 | y | 161.0 | 111.0 |
| 16 | 2 | 20 | 310 | 297.0 | 3.6 | 191.2 | 0.1928 | 51.9 | 3.068 | 3.500 | 18.09 | y | 171.5 | 119.1 |
| 17 | 2 | 20 | 330 | 293.2 | 3.8 | 190.8 | 0.2130 | 55.0 | 3.068 | 3.500 | 19.17 | y | 180.2 | 126.2 |
| 18 | 2 | 20 | 350 | 288.9 | 4.3 | 190.3 | 0.2349 | 58.5 | 3.068 | 3.500 | 20.39 | y | 187.0 | 132.4 |
| 19 | 2 | 20 | 370 | 284.3 | 4.6 | 189.7 | 0.2593 | 62.6 | 3.068 | 3.500 | 21.82 | y | 192.4 | 137.7 |
| 20 | 2 | 20 | 390 | 279.2 | 5.1 | 188.9 | 0.2853 | 67.1 | 3.068 | 3.500 | 23.39 | y | 196.5 | 138.9 |
| 21 | 2 | 20 | 410 | 273.7 | 5.5 | 187.9 | 0.3128 | 72.1 | 3.068 | 3.500 | 25.13 | y | 199.6 | 144.0 |
| 22 | 2 | 20 | 430 | 264.8 | 8.9 | 186.0 | 0.3507 | 80.1 | 3.068 | 3.500 | 27.92 | y | 202.8 | 154.8 |
| 23 | 2 | 20 | 450 | 257.7 | 7.1 | 184.5 | 0.3848 | 80.2 | 3.068 | 3.500 | 27.95 | y | 204.6 | 161.6 |
| 24 | 2 | 20 | 470 | 249.5 | 8.2 | 182.6 | 0.4224 | 95.7 | 3.068 | 3.500 | 33.35 | y | 206.1 | 168.3 |
| 25 | 2 | 20 | 490 | 240.2 | 9.3 | 180.3 | 0.4645 | 106.1 | 3.068 | 3.500 | 36.98 | y | 207.3 | 176.0 |
| 26 | 2 | 20 | 510 | 229.2 | 11.0 | 177.3 | 0.5128 | 119.1 | 3.068 | 3.500 | 41.51 | y | 208.1 | 186.4 |
| 27 | 3 | 20 | 530 | 210.6 | 18.6 | 171.2 | 0.5685 | 139.9 | 3.068 | 3.500 | 48.76 | n | 0.0 | 0 |
| 28 | 3 | 20 | 550 | 176.9 | 33.7 | 158.7 | 0.6710 | 189.6 | 3.068 | 3.500 | 66.08 | n | 0.0 | 0 |
| 29 | 3 | 10 | 560 | 141.0 | 35.9 | 143.0 | 0.7840 | 270.2 | 3.068 | 3.500 | 94.17 | n | 0.0 | 0 |

As indicated in Table 2, the flashline heater of Example 1 has twenty-nine segments which have a total length of 560 ft. In Example 1, the flashline heater has a constant inner diameter of 3.068 in. The first six segments (i.e., the first segment set) are not heated, and the last three segments (i.e., the third segment set) are not heated. The average velocity of polymerization product through the heater ranges from about 25.5 ft/sec in the first segment to about 270.2 ft/sec in the twenty-ninth segment. The Froude number is calculated in each segment of the flashline heater, and the Froude number ranges from about 8.89 to about 94.17. The vapor fraction indicates the vaporization of liquid in the polymerization product, which creates a liquid-gas-solid mixture in the flashline heater of the second pressure differential. As can be seen in Table 2, the vapor fraction is 0.7840 after the last segment of the flashline heater. The residence time of the polymerization product in the flashline heater is about 11.98 seconds.

Example 2

The operating conditions for Example 2 are disclosed in Table 3 below. The same parameters as in Table 1 are shown, with values specific for Example 2.

TABLE 3

| | |
|---|---|
| First Pressure Differential | 233.8 psi |
| Second Pressure Differential | 245.5 psi |
| Total Pressure Differential | 479.3 psi |
| Polymerization Product | |
| Methane | 63.5 lb/hr |
| Ethylene | 2223.3 lb/hr |
| Ethane | 635.2 lb/hr |
| Propane | 127.0 lb/hr |
| Isobutane | 57932.3 lb/hr |
| Butane | 1524.5 lb/hr |
| Hexene | 1334.0 lb/hr |
| Hexane | 127.0 lb/hr |
| Solid Polymer | 60,000 lb/hr |
| Solid Polymer | 48.4 wt % |
| Continuous Take-Off (CTO) Valve | |
| Inlet Temperature | 197.6° F. |
| Outlet Temperature | 195.8° F. |
| Inlet Pressure | 615.0 psia |
| Outlet Pressure | 381.2 psia |
| Vapor Fraction | 0.0000 wt |
| Steam | |
| Temperature | 238° F. |
| Separation Vessel | |
| Pressure | 140 psia |
| Temperature | 175° F. |
| Elevation | 150 ft |

As can be seen in Table 3, the first pressure differential is less than the second pressure differential. Particularly, the first pressure differential is about 48.8% of the total pressure differential, and the second pressure differential is about 51.2% of the total pressure differential. The polymerization product entering and exiting the CTO has 0.0000 wt. % vapor fraction. The particular operating conditions of the flashline heater of Example 2 are shown in Table 4.

TABLE 4

| Segment (#) | Segment Set (#) | Segment Length (ft) | Total Length (ft) | Outlet Pressure (psia) | Drop in Pressure (psi) | Outlet Temp (° F.) | Vapor Fraction (wt) | Avg Velocity (ft/sec) | ID (in) | OD (in) | Froude No. | Heated (y/n) | Overall $U_o$ (B/hr-ft²-F.) | Duty (1k B/hr) |
|---|---|---|---|---|---|---|---|---|---|---|---|---|---|---|
| 1 | 1 | 10 | 10 | 357.5 | 23.7 | 195.5 | 0.0000 | 39.8 | 2.067 | 2.375 | 16.90 | n | 0.0 | 0.0 |
| 2 | 1 | 20 | 30 | 347.3 | 10.2 | 195.4 | 0.0000 | 53.6 | 2.067 | 2.375 | 22.76 | n | 0.0 | 0.0 |
| 3 | 1 | 20 | 50 | 339.1 | 8.2 | 194.5 | 0.0131 | 42.2 | 2.067 | 2.375 | 17.92 | n | 0.0 | 0.0 |
| 4 | 1 | 20 | 70 | 328.6 | 10.5 | 192.9 | 0.0381 | 46.8 | 2.067 | 2.375 | 19.87 | n | 0.0 | 0.0 |
| 5 | 1 | 20 | 90 | 318.5 | 10.1 | 191.2 | 0.0663 | 52 | 2.067 | 2.375 | 22.08 | n | 0.0 | 0.0 |
| 6 | 1 | 20 | 110 | 301.9 | 16.6 | 188.3 | 0.1042 | 61.5 | 2.067 | 2.375 | 26.11 | n | 0.0 | 0.0 |
| 7 | 2 | 20 | 130 | 295.3 | 6.6 | 187.5 | 0.1297 | 47.3 | 2.469 | 2.875 | 18.38 | y | 153.9 | 92.7 |
| 8 | 2 | 20 | 150 | 288.1 | 7.2 | 186.6 | 0.1579 | 52.5 | 2.469 | 2.875 | 20.40 | y | 159.2 | 97.5 |
| 9 | 2 | 20 | 170 | 282.9 | 5.2 | 186.0 | 0.1830 | 56.7 | 2.469 | 2.875 | 22.03 | y | 178.2 | 110.8 |
| 10 | 2 | 20 | 190 | 276.8 | 6.1 | 185.2 | 0.2119 | 62.4 | 2.469 | 2.875 | 24.24 | y | 191.4 | 120.6 |
| 11 | 2 | 20 | 210 | 269.9 | 6.9 | 184.2 | 0.2445 | 68.9 | 2.469 | 2.875 | 26.77 | y | 200.3 | 128.5 |
| 12 | 2 | 20 | 230 | 261.9 | 8.0 | 182.8 | 0.2821 | 76.7 | 2.469 | 2.875 | 29.80 | y | 206.4 | 132.2 |
| 13 | 2 | 20 | 250 | 252.6 | 9.3 | 180.9 | 0.3244 | 86.3 | 2.469 | 2.875 | 33.53 | y | 210.6 | 142.6 |
| 14 | 2 | 20 | 270 | 238.1 | 14.5 | 177.4 | 0.3836 | 101.6 | 2.469 | 2.875 | 39.47 | y | 214.1 | 152.2 |
| 15 | 3 | 20 | 290 | 233.7 | 4.4 | 176.7 | 0.4155 | 70.6 | 3.068 | 3.500 | 24.61 | y | 181.9 | 166.5 |
| 16 | 3 | 20 | 310 | 228.9 | 4.8 | 175.7 | 0.4495 | 76.2 | 3.068 | 3.500 | 26.56 | y | 182.8 | 169.8 |
| 17 | 3 | 20 | 330 | 223.5 | 5.4 | 174.5 | 0.4859 | 82.9 | 3.068 | 3.500 | 28.89 | y | 183.5 | 173.7 |
| 18 | 3 | 20 | 350 | 217.0 | 6.5 | 172.8 | 0.5263 | 90.4 | 3.068 | 3.500 | 31.51 | y | 184.1 | 178.2 |
| 19 | 3 | 20 | 370 | 206.5 | 10.5 | 169.7 | 0.5799 | 102.0 | 3.068 | 3.500 | 35.55 | y | 184.6 | 186.4 |
| 20 | 3 | 20 | 390 | 191.1 | 15.4 | 164.6 | 0.6500 | 121.0 | 3.068 | 3.500 | 42.17 | y | 184.7 | 198.8 |
| 21 | 3 | 20 | 410 | 172.7 | 18.4 | 159.9 | 0.7309 | 147.2 | 3.068 | 3.500 | 51.30 | y | 184.0 | 214.8 |
| 22 | 4 | 20 | 430 | 167.6 | 5.1 | 156.2 | 0.7728 | 92.3 | 4.026 | 4.500 | 28.08 | y | 140.7 | 226.8 |
| 23 | 4 | 20 | 450 | 162.9 | 4.7 | 154.7 | 0.8131 | 99.2 | 4.026 | 4.500 | 30.18 | y | 140.2 | 230.4 |
| 24 | 4 | 20 | 470 | 158.1 | 4.8 | 153.3 | 0.8533 | 106.5 | 4.026 | 4.500 | 32.40 | y | 139.7 | 233.8 |
| 25 | 4 | 20 | 490 | 153.4 | 4.7 | 151.8 | 0.8928 | 114.7 | 4.026 | 4.500 | 34.90 | y | 139.2 | 235.9 |
| 26 | 4 | 20 | 510 | 148.6 | 4.8 | 150.4 | 0.9318 | 123.0 | 4.026 | 4.500 | 37.42 | y | 138.7 | 240.1 |
| 27 | 5 | 20 | 530 | 144.1 | 4.5 | 148.4 | 0.9440 | 128.0 | 4.026 | 4.500 | 38.94 | n | 0.0 | 0 |
| 28 | 5 | 20 | 550 | 139.7 | 4.4 | 146.4 | 0.9563 | 133.7 | 4.026 | 4.500 | 40.68 | n | 0.0 | 0 |
| 29 | 5 | 10 | 560 | 135.7 | 4.0 | 144.7 | 0.9678 | 139.1 | 4.026 | 4.500 | 42.32 | n | 0.0 | 0 |

As indicated in Table 4, the flashline heater of Example 2 has twenty-nine segments which have a total length of 560 ft. In Example 2, the flashline heater has an inner diameter which increases along the length of the flashline heater. Particularly, the segments of the first segment set have an inner diameter of 2.067 in. The segments of the second segment set have an inner diameter of 2.469 in. The segments of the third segment set have an inner diameter of 3.068 in. The segments of the fourth segment set have an inner diameter of 4.026 in. The segments of the fifth segment set also have an inner diameter of 4.026 in and differ from the fourth segment set in that the segments of the fifth segment set are not heated. The first six segments (i.e., the first segment set) are also not heated. The average velocity of polymerization stream through the heater ranges from about 39.8 ft/sec in the first segment to about 147.2 ft/sec in the twenty-first segment. The Froude number is calculated in each segment of the flashline heater, and the Froude number ranges from about 16.9 to about 51.3. As can be seen in Table 4, the vapor fraction is 0.9678 after the last segment of the flashline heater. The residence time of the polymerization product in the flashline heater is about 7.52 seconds.

Example 3

The operating conditions for Example 3 are disclosed in Table 5 below. The same parameters as in Tables 1 and 3 are shown, with values specific for Example 3.

TABLE 5

| | |
|---|---|
| First Pressure Differential | 202.7 psi |
| Second Pressure Differential | 271.3 psi |
| Total Pressure Differential | 474.0 psi |
| Polymerization Product | |
| Methane | 36.2 lb/hr |
| Ethylene | 1266.2 lb/hr |
| Ethane | 361.8 lb/hr |
| Propane | 72.4 lb/hr |
| Isobutane | 32994.4 lb/hr |
| Butane | 868.3 lb/hr |
| Hexene | 759.7 lb/hr |
| Hexane | 72.4 lb/hr |
| Solid Polymer | 34,172 lb/hr |
| Solid Polymer | 48.4 wt % |
| Continuous Take-Off (CTO) Valve | |
| Inlet Temperature | 197.6° F. |
| Outlet Temperature | 196.0° F. |
| Inlet Pressure | 615.0 psia |
| Outlet Pressure | 412.3 psia |
| Vapor Fraction | 0.0000 wt |
| Steam | |
| Temperature | 238° F. |
| Separation Vessel | |
| Pressure | 140 psia |
| Temperature | 175° F. |
| Elevation | 150 ft |

As can be seen in Table 5, the first pressure differential is less than the second pressure differential. Particularly, the first pressure differential is about 42.7% of the total pressure differential, and the second pressure differential is about 57.3% of the total pressure differential. The polymerization product entering and exiting the CTO has 0.0000 wt. % vapor fraction. The particular operating conditions of the flashline heater of Example 3 are shown in Table 6.

TABLE 6

| Segment (#) | Segment Set (#) | Segment Length (ft) | Total Length (ft) | Outlet Pressure (psia) | Drop in Pressure (psi) | Outlet Temp (° F.) | Vapor Fraction (wt) | Avg Velocity (ft/sec) | ID (in) | OD (in) | Froude No. | Heated (y/n) | Overall $U_o$ (B/hr-ft²-F.) | Duty (1k B/hr) |
|---|---|---|---|---|---|---|---|---|---|---|---|---|---|---|
| 1 | 1 | 10 | 10 | 376.7 | 35.6 | 195.7 | 0.0000 | 42.9 | 1.500 | 1.900 | 21.38 | n | 0.0 | 0.0 |
| 2 | 1 | 20 | 30 | 361.9 | 14.8 | 195.5 | 0.0000 | 60.1 | 1.500 | 1.900 | 29.96 | n | 0.0 | 0.0 |
| 3 | 1 | 20 | 50 | 344.4 | 17.5 | 195.2 | 0.0000 | 69.6 | 1.500 | 1.900 | 34.69 | n | 0.0 | 0.0 |
| 4 | 1 | 20 | 70 | 333.0 | 11.4 | 193.5 | 0.0258 | 48.3 | 1.500 | 1.900 | 24.07 | n | 0.0 | 0.0 |
| 5 | 1 | 20 | 90 | 318.1 | 14.9 | 191.0 | 0.0617 | 56.1 | 1.500 | 1.900 | 27.96 | n | 0.0 | 0.0 |
| 6 | 1 | 20 | 110 | 293.2 | 24.9 | 186.5 | 0.1239 | 72.1 | 1.500 | 1.900 | 35.94 | n | 0.0 | 0.0 |
| 7 | 2 | 20 | 130 | 285.7 | 7.5 | 185.7 | 0.1562 | 48.5 | 1.939 | 2.375 | 21.26 | y | 152.5 | 74.8 |
| 8 | 2 | 20 | 150 | 277.2 | 8.5 | 184.6 | 0.1939 | 55.0 | 1.939 | 2.375 | 24.11 | y | 173.4 | 86.7 |
| 9 | 2 | 20 | 170 | 270.0 | 7.2 | 183.7 | 0.2312 | 61.6 | 1.939 | 2.375 | 27.01 | y | 188.6 | 96.1 |
| 10 | 2 | 20 | 190 | 261.4 | 8.6 | 182.4 | 0.2750 | 69.8 | 1.939 | 2.375 | 30.60 | y | 196.9 | 99.8 |
| 11 | 2 | 20 | 210 | 251.2 | 10.2 | 180.5 | 0.3252 | 80.2 | 1.939 | 2.375 | 35.16 | y | 202.1 | 108.4 |
| 12 | 2 | 20 | 230 | 238.7 | 12.5 | 177.6 | 0.3842 | 93.7 | 1.939 | 2.375 | 41.08 | y | 205.5 | 115 |
| 13 | 2 | 20 | 250 | 222.7 | 16.0 | 173.5 | 0.4566 | 112.7 | 1.939 | 2.375 | 49.41 | y | 207.8 | 124 |
| 14 | 2 | 20 | 270 | 191.4 | 31.3 | 163.4 | 0.5801 | 156.7 | 1.939 | 2.375 | 68.70 | y | 209.8 | 140.3 |
| 15 | 3 | 20 | 290 | 186.5 | 4.9 | 162.2 | 0.6288 | 68.7 | 3.068 | 3.500 | 23.94 | y | 144.7 | 164.1 |
| 16 | 3 | 20 | 310 | 180.9 | 5.6 | 160.7 | 0.6806 | 75.6 | 3.068 | 3.500 | 26.35 | y | 144.6 | 167.8 |
| 17 | 3 | 20 | 330 | 175.1 | 5.8 | 159.0 | 0.7331 | 82.8 | 3.068 | 3.500 | 28.86 | y | 144.2 | 171 |
| 18 | 3 | 20 | 350 | 169.2 | 5.9 | 157.2 | 0.7862 | 90.9 | 3.068 | 3.500 | 31.68 | y | 143.8 | 174.3 |
| 19 | 3 | 20 | 370 | 163.2 | 6.0 | 155.4 | 0.8391 | 100.1 | 3.068 | 3.500 | 34.89 | y | 143.2 | 177.8 |
| 20 | 3 | 20 | 390 | 157.3 | 5.9 | 153.7 | 0.8917 | 109.6 | 3.068 | 3.500 | 38.20 | y | 142.6 | 180.6 |
| 21 | 3 | 20 | 410 | 151.3 | 6.0 | 152.1 | 0.9426 | 119.8 | 3.068 | 3.500 | 41.75 | y | 141.9 | 183.3 |
| 22 | 4 | 20 | 430 | 149.7 | 1.6 | 152.4 | 0.9788 | 72.7 | 4.026 | 4.500 | 22.12 | y | 103.6 | 177.4 |
| 23 | 4 | 20 | 450 | 148.3 | 1.4 | 154.5 | 1.0000 | 75.4 | 4.026 | 4.500 | 22.94 | y | 103.5 | 171.1 |
| 24 | 4 | 20 | 470 | 147.1 | 1.2 | 159.1 | 1.0000 | 77.3 | 4.026 | 4.500 | 23.52 | y | 103.7 | 164.2 |
| 25 | 4 | 20 | 490 | 145.8 | 1.3 | 163.4 | 1.0000 | 79.2 | 4.026 | 4.500 | 24.10 | y | 104.3 | 155.9 |
| 26 | 4 | 20 | 510 | 144.6 | 1.2 | 167.5 | 1.0000 | 81.0 | 4.026 | 4.500 | 24.64 | y | 104.9 | 147.9 |
| 27 | 5 | 20 | 530 | 143.3 | 1.3 | 167.4 | 1.0000 | 81.8 | 4.026 | 4.500 | 24.89 | n | 0.0 | 0 |
| 28 | 5 | 20 | 550 | 142.1 | 1.2 | 167.3 | 1.0000 | 82.6 | 4.026 | 4.500 | 25.13 | n | 0.0 | 0 |
| 29 | 5 | 10 | 560 | 141.0 | 1.1 | 167.2 | 1.0000 | 83.4 | 4.026 | 4.500 | 25.37 | n | 0.0 | 0 |

As indicated in Table 6, the flashline heater of Example 3 has twenty-nine segments which have a total length of 560 ft. In Example 3, the flashline heater has an inner diameter which increases along the length of the flashline heater. Particularly, the segments of the first segment set have an inner diameter of 1.500 in. The segments of the second segment set have an inner diameter of 1.939 in. The segments of the third segment set have an inner diameter of 3.068 in. The segments of the fourth segment set have an inner diameter of 4.026 in. The segments of the fifth segment set also have an inner diameter of 4.026 in and differ from the fourth segment set in that the segments of the fifth segment set are not heated. The first six segments (i.e., the first segment set) are also not heated. The average velocity of polymerization product through the heater ranges from about 42.9 ft/sec in the first segment to about 156.7 ft/sec in the fourteenth segment. The Froude number is calculated in each segment of the flashline heater, and the Froude number ranges from about 21.26 to about 68.7. As can be seen in Table 6, the vapor fraction is 1.0000 after the last segment of the flashline heater. The residence time of the polymerization product in the flashline heater is about 7.53 seconds.

Example 4

The operating conditions for Example 4 are disclosed in Table 7 below. The same parameters as in Tables 1, 3, and 5 are shown, with values specific for Example 4.

TABLE 7

| | |
|---|---|
| First Pressure Differential | 221.7 psi |
| Second Pressure Differential | 251.8 psi |
| Total Pressure Differential | 473.5 psi |
| Polymerization Product | |
| Methane | 36.2 lb/hr |
| Ethylene | 1266.2 lb/hr |
| Ethane | 361.8 lb/hr |
| Propane | 72.4 lb/hr |
| Isobutane | 32994.4 lb/hr |
| Butane | 868.3 lb/hr |
| Hexene | 759.7 lb/hr |
| Hexane | 72.4 lb/hr |
| Solid Polymer | 34,172 lb/hr |
| Solid Polymer | 48.4 wt % |
| Continuous Take-Off (CTO) Valve | |
| Inlet Temperature | 197.6° F. |
| Outlet Temperature | 195.9° F. |
| Inlet Pressure | 615.0 psia |
| Outlet Pressure | 393.3 psia |
| Vapor Fraction | 0.0000 wt |
| Steam | |
| Temperature | 222° F. |
| Separation Vessel | |
| Pressure | 140 psia |
| Temperature | 175° F. |
| Elevation | 150 ft |

As can be seen in Table 7, the first pressure differential is less than the second pressure differential. Particularly, the first pressure differential is about 46.8% of the total pressure differential, and the second pressure differential is about 53.2% of the total pressure differential. The polymerization product entering and exiting the CTO has 0.0000 wt. % vapor fraction. The particular operating conditions of the flashline heater of Example 4 are shown in Table 8.

TABLE 8

| Segment (#) | Segment Set (#) | Segment Length (ft) | Total Length (ft) | Outlet Pressure (psia) | Drop in Pressure (psi) | Outlet Temp (° F.) | Vapor Fraction (wt) | Avg Velocity (ft/sec) | ID (in) | OD (in) | Froude No. | Heated (y/n) | Overall $U_o$ (B/hr-ft²-F.) | Duty (1k B/hr) |
|---|---|---|---|---|---|---|---|---|---|---|---|---|---|---|
| 1 | 1 | 30 | 30 | 359.3 | 34.0 | 195.6 | 0.0000 | 25.7 | 1.939 | 2.375 | 11.27 | n | 0.0 | 0.0 |
| 2 | 1 | 30 | 60 | 349.8 | 9.5 | 195.5 | 0.0000 | 31.1 | 1.939 | 2.375 | 13.63 | n | 0.0 | 0.0 |
| 3 | 1 | 30 | 90 | 340.3 | 9.5 | 194.7 | 0.0708 | 26.9 | 1.939 | 2.375 | 11.79 | n | 0.0 | 0.0 |
| 4 | 1 | 30 | 120 | 331.1 | 9.2 | 193.4 | 0.0326 | 29.7 | 1.939 | 2.375 | 13.02 | n | 0.0 | 0.0 |
| 5 | 1 | 30 | 150 | 322.5 | 8.6 | 192.0 | 0.0537 | 32.3 | 1.939 | 2.375 | 14.16 | n | 0.0 | 0.0 |
| 6 | 1 | 30 | 180 | 315.9 | 6.6 | 190.9 | 0.0698 | 34.6 | 1.939 | 2.375 | 15.17 | n | 0.0 | 0.0 |
| 7 | 2 | 40 | 220 | 310.7 | 5.2 | 190.9 | 0.0987 | 34.1 | 2.067 | 2.375 | 14.48 | y | 160.1 | 98.8 |
| 8 | 2 | 40 | 260 | 304.5 | 6.2 | 19.7 | 0.1304 | 38.1 | 2.067 | 2.375 | 16.18 | y | 151.0 | 93.5 |
| 9 | 2 | 40 | 300 | 297.2 | 7.3 | 190.1 | 0.1672 | 43.0 | 2.067 | 2.375 | 18.26 | y | 155.7 | 97.7 |
| 10 | 2 | 40 | 340 | 288.2 | 9.0 | 189.2 | 0.2128 | 49.4 | 2.067 | 2.375 | 20.98 | y | 179.0 | 115.2 |
| 11 | 2 | 40 | 380 | 277.2 | 11.0 | 187.6 | 0.2698 | 58.0 | 2.067 | 2.375 | 24.63 | y | 197.7 | 126.7 |
| 12 | 2 | 40 | 420 | 263.1 | 14.1 | 185.1 | 0.3395 | 69.7 | 2.067 | 2.375 | 29.60 | y | 207.9 | 148.1 |
| 13 | 2 | 40 | 460 | 244.4 | 18.7 | 180.9 | 0.4286 | 87.0 | 2.067 | 2.375 | 36.94 | y | 213.6 | 168.6 |
| 14 | 2 | 40 | 500 | 213.5 | 30.9 | 182.2 | 0.5625 | 120.9 | 2.067 | 2.375 | 51.34 | y | 217.2 | 201.1 |
| 15 | 3 | 30 | 530 | 207.1 | 6.4 | 170.7 | 0.6169 | 61.0 | 3.068 | 3.500 | 21.26 | y | 146.1 | 165.9 |
| 16 | 3 | 30 | 560 | 199.1 | 8.0 | 168.5 | 0.6774 | 68.5 | 3.068 | 3.500 | 23.87 | y | 146.1 | 173.5 |
| 17 | 3 | 30 | 590 | 190.8 | 8.3 | 166.1 | 0.7397 | 76.6 | 3.068 | 3.500 | 26.70 | y | 145.8 | 181.3 |
| 18 | 3 | 30 | 620 | 182.4 | 8.4 | 163.6 | 0.8032 | 86.2 | 3.068 | 3.500 | 30.04 | y | 145.2 | 188.8 |
| 19 | 3 | 30 | 650 | 173.8 | 8.6 | 161.1 | 0.8671 | 96.7 | 3.068 | 3.500 | 33.70 | y | 144.5 | 195.8 |
| 20 | 3 | 30 | 680 | 165.3 | 8.5 | 158.6 | 0.9298 | 108.2 | 3.068 | 3.500 | 37.71 | y | 143.6 | 202.7 |
| 21 | 3 | 30 | 710 | 157.0 | 8.3 | 156.4 | 0.9901 | 120.8 | 3.068 | 3.500 | 42.10 | y | 142.7 | 209.1 |
| 22 | 4 | 30 | 740 | 154.9 | 2.1 | 160.5 | 1.0000 | 72.9 | 4.026 | 4.500 | 22.18 | y | 104.1 | 192.3 |
| 23 | 4 | 30 | 770 | 153.1 | 1.8 | 165.4 | 1.0000 | 75.0 | 4.026 | 4.500 | 22.82 | y | 104.6 | 178.8 |
| 24 | 4 | 30 | 800 | 151.2 | 1.9 | 169.9 | 1.0000 | 77.2 | 4.026 | 4.500 | 23.49 | y | 105.3 | 164.9 |
| 25 | 4 | 30 | 830 | 149.4 | 1.8 | 174.1 | 1.0000 | 79.3 | 4.026 | 4.500 | 24.13 | y | 106.0 | 152 |
| 26 | 4 | 30 | 860 | 147.5 | 1.9 | 177.8 | 1.0000 | 81.4 | 4.026 | 4.500 | 24.77 | y | 106.6 | 140.1 |
| 27 | 5 | 30 | 890 | 145.7 | 1.8 | 177.7 | 1.0000 | 82.6 | 4.026 | 4.500 | 25.13 | n | 0.0 | 0 |
| 28 | 5 | 30 | 920 | 143.8 | 1.9 | 177.5 | 1.0000 | 83.8 | 4.026 | 4.500 | 25.50 | n | 0.0 | 0 |
| 29 | 5 | 30 | 950 | 141.5 | 2.3 | 177.3 | 1.0000 | 85.4 | 4.026 | 4.500 | 25.98 | n | 0.0 | 0 |

As indicated in Table 8, the flashline heater of Example 4 has twenty-nine segments which have a total length of 950 ft. In Example 4, the flashline heater has an inner diameter which increases along the length of the flashline heater. Particularly, the segments of the first segment set have an inner diameter of 1.939 in. The segments of the second segment set have an inner diameter of 2.067 in. The segments of the third segment set have an inner diameter of 3.068 in. The segments of the fourth segment set have an inner diameter of 4.026 in. The segments of the fifth segment set also have an inner diameter of 4.026 in and differ from the fourth segment set in that the segments of the fifth segment set are not heated. The first six segments (i.e., the first segment set) are also not heated. The average velocity of polymerization product through the heater ranges from about 25.7 ft/sec to about 120.9 ft/sec. The Froude number is calculated in each segment of the flashline heater, and the Froude number ranges from about 11.27 to about 51.34. As can be seen in Table 8, the vapor fraction is 1.0000 after the last segment of the flashline heater. The residence time of the polymerization product in the flashline heater of Example 4 is about 17.59 seconds.

Example 5

The operating conditions for Example 5 are disclosed in Table 9 below. The same parameters as in Tables 1, 3, 5, and 7 are shown, with values specific for Example 5.

TABLE 9

| | |
|---|---|
| First Pressure Differential | 267.2 psi |
| Second Pressure Differential | 206.1 psi |
| Total Pressure Differential | 473.3 psi |
| Slurry Composition | |
| Methane | 68.0 lb/hr |
| Ethylene | 2674.5 lb/hr |
| Ethane | 784.3 lb/hr |
| Propane | 166.5 lb/hr |
| Isobutane | 78012.5 lb/hr |
| Butane | 2068.0 lb/hr |
| Hexene | 1860.4 lb/hr |
| Hexane | 177.4 lb/hr |
| Solid Polymer | 85,000 lb/hr |
| Solid Polymer | 48.4 wt % |
| Continuous Take-Off (CTO) Valve | |
| Inlet Temperature | 197.6° F. |
| Outlet Temperature | 195.4° F. |
| Inlet Pressure | 615.0 psia |
| Outlet Pressure | 347.8 psia |
| Vapor Fraction | 0.0531 wt |
| Steam | |
| Temperature | 238° F. |
| Separation Vessel | |
| Pressure | 140 psia |
| Temperature | 175° F. |
| Elevation | 150 ft |

As can be seen in Table 9, the first pressure differential is greater than the second pressure differential. Particularly, the first pressure differential is about 56.5% of the total pressure differential, and the second pressure differential is about 43.5% of the total pressure differential. The polymerization product exiting the CTO is a mixture having about 5.31% vapor phase by weight of the mixture. The particular operating conditions of the flashline heater of Example 5 are shown in Table 10.

TABLE 10

| Segment (#) | Segment Set (#) | Segment Length (ft) | Total Length (ft) | Outlet Pressure (psia) | Drop in Pressure (psi) | Outlet Temp (° F.) | Vapor Fraction (wt) | Avg Velocity (ft/sec) | ID (in) | OD (in) | Froude No. | Heated (y/n) | Overall $U_o$ (B/hr-ft²-F.) | Duty (1k B/hr) |
|---|---|---|---|---|---|---|---|---|---|---|---|---|---|---|
| 1 | 1 | 10 | 10 | 343.5 | 4.3 | 195.2 | 0.0028 | 27.0 | 3.068 | 3.500 | 9.41 | n | 0.0 | 0.0 |
| 2 | 1 | 20 | 30 | 337.3 | 6.2 | 194.3 | 0.0176 | 27.8 | 3.068 | 3.500 | 9.69 | n | 0.0 | 0.0 |
| 3 | 1 | 20 | 50 | 332.3 | 5.0 | 193.5 | 0.0295 | 29.0 | 3.068 | 3.500 | 10.11 | n | 0.0 | 0.0 |
| 4 | 1 | 20 | 70 | 327.5 | 4.8 | 192.8 | 0.0411 | 30.5 | 3.068 | 3.500 | 10.63 | n | 0.0 | 0.0 |
| 5 | 1 | 20 | 90 | 322.8 | 4.7 | 192.0 | 0.0527 | 32.1 | 3.068 | 3.500 | 11.19 | n | 0.0 | 0.0 |
| 6 | 1 | 20 | 110 | 316.2 | 6.6 | 190.9 | 0.0689 | 34.3 | 3.068 | 3.500 | 11.95 | n | 0.0 | 0.0 |
| 7 | 2 | 20 | 130 | 311.2 | 5.0 | 190.5 | 0.0883 | 37.0 | 3.068 | 3.500 | 12.90 | y | 157.6 | 111.2 |
| 8 | 2 | 20 | 150 | 306.2 | 5.0 | 190.0 | 0.1082 | 39.9 | 3.068 | 3.500 | 13.91 | y | 151.5 | 107.9 |
| 9 | 2 | 20 | 170 | 303.6 | 2.6 | 189.9 | 0.1219 | 41.9 | 3.068 | 3.500 | 14.60 | y | 146.1 | 104.7 |
| 10 | 2 | 20 | 190 | 300.7 | 2.9 | 189.7 | 0.1362 | 44.0 | 3.068 | 3.500 | 15.34 | y | 142.6 | 102.5 |
| 11 | 2 | 20 | 210 | 297.7 | 3.0 | 189.5 | 0.1516 | 46.3 | 3.068 | 3.500 | 16.14 | y | 147.3 | 106.3 |
| 12 | 2 | 20 | 230 | 294.4 | 3.3 | 189.3 | 0.1685 | 48.9 | 3.068 | 3.500 | 17.04 | y | 159.9 | 116.0 |
| 13 | 2 | 20 | 250 | 290.9 | 3.5 | 188.9 | 0.1872 | 51.8 | 3.068 | 3.500 | 18.05 | y | 170.9 | 124.7 |
| 14 | 2 | 20 | 270 | 284.8 | 6.1 | 188.0 | 0.2138 | 56.2 | 3.068 | 3.500 | 19.59 | y | 181.0 | 133.8 |
| 15 | 2 | 20 | 290 | 280.4 | 4.4 | 187.5 | 0.2367 | 60.1 | 3.068 | 3.500 | 20.95 | y | 188.8 | 141.7 |
| 16 | 2 | 20 | 310 | 275.6 | 4.8 | 186.8 | 0.2614 | 64.4 | 3.068 | 3.500 | 22.45 | y | 193.7 | 147.2 |
| 17 | 2 | 20 | 330 | 270.3 | 5.3 | 186.0 | 0.2887 | 69.3 | 3.068 | 3.500 | 24.15 | y | 197.5 | 148.4 |
| 18 | 2 | 20 | 350 | 264.4 | 5.9 | 184.9 | 0.3178 | 75.3 | 3.068 | 3.500 | 26.24 | y | 200.6 | 154.0 |
| 19 | 2 | 20 | 370 | 257.8 | 6.6 | 183.6 | 0.3499 | 81.8 | 3.068 | 3.500 | 28.51 | y | 202.9 | 163.4 |
| 20 | 2 | 20 | 390 | 250.4 | 7.4 | 181.9 | 0.3852 | 89.6 | 3.068 | 3.500 | 31.23 | y | 204.7 | 169.6 |
| 21 | 2 | 20 | 410 | 241.9 | 8.5 | 179.9 | 0.4244 | 98.8 | 3.068 | 3.500 | 34.43 | y | 206.1 | 176.6 |
| 22 | 2 | 20 | 430 | 229.1 | 12.8 | 176.4 | 0.4779 | 113.1 | 3.068 | 3.500 | 39.42 | y | 207.6 | 187.7 |
| 23 | 2 | 20 | 450 | 216.2 | 12.9 | 172.6 | 0.5335 | 129.8 | 3.068 | 3.500 | 45.24 | y | 208.2 | 199.7 |
| 24 | 2 | 20 | 470 | 188.4 | 27.8 | 163.1 | 0.6361 | 170.2 | 3.068 | 3.500 | 59.32 | y | 209.1 | 222.5 |
| 25 | 3 | 20 | 490 | 179.2 | 9.2 | 160.0 | 0.6847 | 110.7 | 4.026 | 4.500 | 33.68 | y | 165.2 | 251.8 |
| 26 | 3 | 20 | 510 | 169.8 | 9.4 | 156.6 | 0.7350 | 123.9 | 4.026 | 4.500 | 37.70 | y | 164.6 | 261.7 |
| 27 | 4 | 20 | 530 | 160.3 | 9.5 | 152.5 | 0.7641 | 135.6 | 4.026 | 4.500 | 41.26 | n | 0.0 | 0.0 |
| 28 | 4 | 20 | 550 | 150.6 | 9.7 | 148.2 | 0.7944 | 149.1 | 4.026 | 4.500 | 45.36 | n | 0.0 | 0.0 |
| 29 | 4 | 10 | 560 | 141.7 | 8.9 | 144.1 | 0.8221 | 163.1 | 4.026 | 4.500 | 49.62 | n | 0.0 | 0.0 |

As indicated in Table 10, the flashline heater of Example 5 has twenty-nine segments which have a total length of 560 ft. In Example 5, the flashline heater has an inner diameter which increases along the length of the flashline heater. Particularly, the segments of the first segment set have an inner diameter of 3.068 in. The segments of the second segment set have an inner diameter of 3.068 in. The segments of the third segment set have an inner diameter of 4.026 in. The segments of the fourth segment set have an inner diameter of 4.026 in. The first six segments (i.e., the first segment set) and the fourth segment set are not heated. The second segment set and the third segment set are heated. The average velocity of polymerization product through the heater ranges from about 27.0 ft/sec to about 163.1 ft/sec. The Froude number is calculated in each segment of the flashline heater, and the Froude number ranges from about 9.41 to about 59.32. The residence time of the polymerization product in the flashline heater of Example 5 is about 10.19 seconds.

Example 6

The operating conditions for Example 6 are disclosed in Table 11 below. The same parameters as in Tables 1, 3, 5, 7, and 9 are shown, with values specific for Example 6.

TABLE 11

| | |
|---|---|
| First Pressure Differential | 274.6 psi |
| Second Pressure Differential | 196.7 psi |
| Total Pressure Differential | 471.3 psi |
| Slurry Composition | |
| Methane | 51.3 lb/hr |
| Ethylene | 1968.2 lb/hr |
| Ethane | 573.8 lb/hr |
| Propane | 120.1 lb/hr |
| Isobutane | 55879.3 lb/hr |
| Butane | 1478.4 lb/hr |
| Hexene | 1319.7 lb/hr |
| Hexane | 125.8 lb/hr |
| Solid Polymer | 60,000 lb/hr |
| Solid Polymer | 48.4 wt % |
| Continuous Take-Off (CTO) Valve | |
| Inlet Temperature | 197.6° F. |
| Outlet Temperature | 194.8° F. |
| Inlet Pressure | 615.0 psia |
| Outlet Pressure | 340.4 psia |
| Vapor Fraction | 0.0383 wt |
| Steam | |
| Temperature | 238° F. |
| Separation Vessel | |
| Pressure | 140 psia |
| Temperature | 175° F. |
| Elevation | 150 ft |

As can be seen in Table 11, the first pressure differential is greater than the second pressure differential. Particularly, the first pressure differential is about 58.3% of the total pressure differential, and the second pressure differential is about 41.7% of the total pressure differential. The polymerization product exiting the CTO is a mixture having about 3.83% vapor phase by weight of the mixture. The particular operating conditions of the flashline heater of Example 6 are shown in Table 12.

TABLE 12

| Segment (#) | Segment Set (#) | Segment Length (ft) | Total Length (ft) | Outlet Pressure (psia) | Drop in Pressure (psi) | Outlet Temp (° F.) | Vapor Fraction (wt) | Avg Velocity (ft/sec) | ID (in) | OD (in) | Froude No. | Heated (y/n) | Overall $U_o$ (B/hr-ft$^2$-F.) | Duty (1k B/hr) |
|---|---|---|---|---|---|---|---|---|---|---|---|---|---|---|
| 1 | 1 | 10 | 10 | 334.4 | 6.0 | 193.9 | 0.0247 | 31.1 | 2.469 | 2.875 | 12.08 | n | 0.0 | 0.0 |
| 2 | 1 | 20 | 30 | 328.8 | 5.6 | 193.0 | 0.0383 | 32.8 | 2.469 | 2.875 | 12.74 | n | 0.0 | 0.0 |
| 3 | 1 | 20 | 50 | 323.2 | 5.6 | 192.1 | 0.0519 | 34.8 | 2.469 | 2.875 | 13.52 | n | 0.0 | 0.0 |
| 4 | 1 | 20 | 70 | 317.5 | 5.7 | 191.1 | 0.0658 | 36.9 | 2.469 | 2.875 | 14.34 | n | 0.0 | 0.0 |
| 5 | 1 | 20 | 90 | 311.8 | 5.7 | 190.1 | 0.0802 | 39.1 | 2.469 | 2.875 | 15.19 | n | 0.0 | 0.0 |
| 6 | 1 | 20 | 110 | 303.3 | 8.5 | 188.6 | 0.1016 | 42.6 | 2.469 | 2.875 | 16.55 | n | 0.0 | 0.0 |
| 7 | 2 | 20 | 130 | 296.7 | 6.6 | 187.9 | 0.1270 | 46.8 | 2.469 | 2.875 | 18.18 | y | 154.9 | 92.6 |
| 8 | 2 | 20 | 150 | 289.7 | 7.0 | 186.9 | 0.1546 | 51.5 | 2.469 | 2.875 | 20.01 | y | 158.2 | 96.2 |
| 9 | 2 | 20 | 170 | 284.5 | 5.2 | 186.4 | 0.1792 | 55.9 | 2.469 | 2.875 | 21.72 | y | 175.8 | 108.5 |
| 10 | 2 | 20 | 190 | 278.6 | 5.9 | 185.7 | 0.2074 | 61.5 | 2.469 | 2.875 | 23.89 | y | 189.6 | 118.6 |
| 11 | 2 | 20 | 210 | 271.8 | 6.8 | 184.7 | 0.2394 | 67.7 | 2.469 | 2.875 | 26.30 | y | 199.1 | 126.6 |
| 12 | 2 | 20 | 230 | 264.0 | 7.8 | 183.3 | 0.2763 | 75.3 | 2.469 | 2.875 | 29.25 | y | 205.6 | 130.3 |
| 13 | 2 | 20 | 250 | 255.0 | 9.0 | 181.6 | 0.3175 | 84.4 | 2.469 | 2.875 | 32.79 | y | 210.0 | 140.7 |
| 14 | 2 | 20 | 270 | 240.9 | 14.1 | 178.2 | 0.3752 | 99.0 | 2.469 | 2.875 | 38.46 | y | 213.7 | 150.1 |
| 15 | 3 | 20 | 290 | 236.7 | 4.2 | 177.5 | 0.4063 | 68.8 | 3.068 | 3.500 | 23.98 | y | 181.6 | 164.0 |
| 16 | 3 | 20 | 310 | 232.0 | 4.7 | 176.6 | 0.4394 | 74.0 | 3.068 | 3.500 | 25.79 | y | 182.6 | 167.1 |
| 17 | 3 | 20 | 330 | 226.8 | 5.2 | 175.5 | 0.4748 | 80.3 | 3.068 | 3.500 | 27.99 | y | 183.4 | 170.8 |
| 18 | 3 | 20 | 350 | 221.0 | 5.8 | 174.1 | 0.5128 | 87.2 | 3.068 | 3.500 | 30.39 | y | 184.0 | 174.9 |
| 19 | 3 | 20 | 370 | 211.9 | 9.1 | 171.5 | 0.5616 | 97.1 | 3.068 | 3.500 | 33.84 | y | 184.5 | 182.0 |
| 20 | 3 | 20 | 390 | 198.2 | 13.7 | 167.2 | 0.6258 | 113.2 | 3.068 | 3.500 | 39.45 | y | 184.9 | 192.6 |
| 21 | 3 | 20 | 410 | 180.3 | 17.9 | 160.8 | 0.7043 | 136.6 | 3.068 | 3.500 | 47.61 | y | 184.5 | 207.5 |
| 22 | 4 | 20 | 430 | 175.2 | 5.1 | 159.3 | 0.7451 | 85.6 | 4.026 | 4.500 | 26.04 | y | 141.3 | 219.2 |
| 23 | 4 | 20 | 450 | 170.6 | 4.6 | 157.9 | 0.7846 | 91.8 | 4.026 | 4.500 | 27.93 | y | 140.9 | 222.7 |
| 24 | 4 | 20 | 470 | 166.0 | 4.6 | 156.5 | 0.8242 | 98.5 | 4.026 | 4.500 | 29.97 | y | 140.5 | 226.0 |
| 25 | 4 | 20 | 490 | 161.3 | 4.7 | 155.0 | 0.8636 | 105.5 | 4.026 | 4.500 | 32.10 | y | 140.0 | 229.3 |
| 26 | 4 | 20 | 510 | 156.6 | 4.7 | 153.6 | 0.9026 | 113.4 | 4.026 | 4.500 | 34.50 | y | 139.5 | 231.4 |
| 27 | 5 | 20 | 530 | 152.2 | 4.4 | 151.7 | 0.9153 | 118.0 | 4.026 | 4.500 | 35.90 | n | 0.0 | 0.0 |
| 28 | 5 | 20 | 550 | 147.7 | 4.5 | 149.8 | 0.9278 | 123.0 | 4.026 | 4.500 | 37.42 | n | 0.0 | 0.0 |
| 29 | 5 | 10 | 560 | 143.7 | 4.0 | 148.0 | 0.9386 | 127.8 | 4.026 | 4.500 | 38.88 | n | 0.0 | 0.0 |

As indicated in Table 12, the flashline heater of Example 6 has twenty-nine segments which have a total length of 560 ft. In Example 6, the flashline heater has an inner diameter which increases along the length of the flashline heater. Particularly, the segments of the first segment set have an inner diameter of 2.469 in and are not heated. The segments of the second segment set have an inner diameter of 2.469 in and are heated. The segments of the third segment set have an inner diameter of 3.068 in and are heated. The segments of the fourth segment set have an inner diameter of 4.026 in and are heated. The segments of the fifth segment set have an inner diameter of 4.026 in are not heated. The average velocity of polymerization product through the heater ranges from about 31.1 ft/sec to about 136.6 ft/sec. The Froude number is calculated in each segment of the flashline heater, and the Froude number ranges from about 12.08 to about 39.45. The residence time of the polymerization product in the flashline heater of Example 6 is about 8.53 seconds.

Example 7

The operating conditions for Example 7 are disclosed in Table 13 below. The same parameters as in Tables 1, 3, 5, 7, 9, and 11 are shown, with values specific for Example 7.

TABLE 13

| | |
|---|---|
| First Pressure Differential | 267.2 psi |
| Second Pressure Differential | 203.3 psi |
| Total Pressure Differential | 470.5 psi |
| Slurry Composition | |
| Methane | 27.4 lb/hr |
| Ethylene | 1075.2 lb/hr |
| Ethane | 315.3 lb/hr |
| Propane | 66.9 lb/hr |
| Isobutane | 31362.9 lb/hr |
| Butane | 831.4 lb/hr |
| Hexene | 747.9 lb/hr |
| Hexane | 71.3 lb/hr |
| Solid Polymer | 34,172 lb/hr |
| Solid Polymer | 48.4 wt % |
| Continuous Take-Off (CTO) Valve | |
| Inlet Temperature | 197.6° F. |
| Outlet Temperature | 195.4° F. |
| Inlet Pressure | 615.0 psia |
| Outlet Pressure | 347.8 psia |
| Vapor Fraction | 0.0531 wt |
| Steam | |
| Temperature | 238° F. |
| Separation Vessel | |
| Pressure | 140 psia |
| Temperature | 175° F. |
| Elevation | 150 ft |

As can be seen in Table 13, the first pressure differential is greater than the second pressure differential. Particularly, the first pressure differential is about 56.8% of the total pressure differential, and the second pressure differential is about 43.2% of the total pressure differential. The polymerization product exiting the CTO is a mixture having 5.31% vapor phase by weight of the mixture. The particular operating conditions of the flashline heater of Example 7 are shown in Table 14.

TABLE 14

| Segment (#) | Segment Set (#) | Segment Length (ft) | Total Length (ft) | Outlet Pressure (psia) | Drop in Pressure (psi) | Outlet Temp (° F.) | Vapor Fraction (wt) | Avg Velocity (ft/sec) | ID (in) | OD (in) | Froude No. | Heated (y/n) | Overall $U_o$ (B/hr-ft$^2$-F.) | Duty (1k B/hr) |
|---|---|---|---|---|---|---|---|---|---|---|---|---|---|---|
| 1 | 1 | 10 | 10 | 337.8 | 10.0 | 194.3 | 0.0162 | 46.3 | 1.500 | 1.900 | 23.08 | n | 0.0 | 0.0 |
| 2 | 1 | 20 | 30 | 322.7 | 15.1 | 191.9 | 0.0523 | 53.9 | 1.500 | 1.900 | 26.87 | n | 0.0 | 0.0 |
| 3 | 1 | 20 | 50 | 306.8 | 15.9 | 189.2 | 0.0916 | 63.1 | 1.500 | 1.900 | 31.45 | n | 0.0 | 0.0 |
| 4 | 1 | 20 | 70 | 287.3 | 19.5 | 185.4 | 0.1415 | 77.2 | 1.500 | 1.900 | 38.48 | n | 0.0 | 0.0 |
| 5 | 2 | 20 | 90 | 279.6 | 7.7 | 183.8 | 0.1616 | 49.7 | 1.939 | 2.375 | 21.79 | n | 0.0 | 0.0 |
| 6 | 2 | 20 | 110 | 268.8 | 10.8 | 181.5 | 0.1906 | 55.6 | 1.939 | 2.375 | 24.38 | n | 0.0 | 0.0 |
| 7 | 3 | 20 | 130 | 259.1 | 9.7 | 180.0 | 0.2355 | 64.1 | 1.939 | 2.375 | 28.10 | y | 190.2 | 103.2 |
| 8 | 3 | 20 | 150 | 247.7 | 11.4 | 177.9 | 0.2883 | 75.1 | 1.939 | 2.375 | 32.92 | y | 199.0 | 108.9 |
| 9 | 3 | 20 | 170 | 236.3 | 11.4 | 175.6 | 0.3438 | 87.6 | 1.939 | 2.375 | 38.40 | y | 203.6 | 118.4 |
| 10 | 3 | 20 | 190 | 221.9 | 14.4 | 172.0 | 0.4108 | 104.8 | 1.939 | 2.375 | 45.94 | y | 206.5 | 126.0 |
| 11 | 3 | 20 | 210 | 202.6 | 19.3 | 166.3 | 0.4967 | 131.6 | 1.939 | 2.375 | 57.69 | y | 208.3 | 137.5 |
| 12 | 4 | 20 | 230 | 199.8 | 2.8 | 166.1 | 0.5368 | 56.6 | 3.068 | 3.500 | 19.73 | y | 144.5 | 156.4 |
| 13 | 4 | 20 | 250 | 196.1 | 3.7 | 165.4 | 0.5807 | 61.4 | 3.068 | 3.500 | 21.40 | y | 144.9 | 157.8 |
| 14 | 4 | 20 | 270 | 190.7 | 5.4 | 164.1 | 0.6301 | 67.3 | 3.068 | 3.500 | 23.46 | y | 145.0 | 160.2 |
| 15 | 4 | 20 | 290 | 185.1 | 5.6 | 162.6 | 0.6810 | 73.9 | 3.068 | 3.500 | 25.76 | y | 144.9 | 164.0 |
| 16 | 4 | 20 | 310 | 179.4 | 5.7 | 161.0 | 0.7326 | 80.8 | 3.068 | 3.500 | 28.16 | y | 144.6 | 167.1 |
| 17 | 4 | 20 | 330 | 173.6 | 5.8 | 159.3 | 0.7847 | 88.5 | 3.068 | 3.500 | 30.84 | y | 144.1 | 170.3 |
| 18 | 4 | 20 | 350 | 167.7 | 5.9 | 157.5 | 0.8369 | 97.2 | 3.068 | 3.500 | 33.88 | y | 143.6 | 173.5 |
| 19 | 4 | 20 | 370 | 161.8 | 5.9 | 155.8 | 0.8886 | 106.2 | 3.068 | 3.500 | 37.01 | y | 143.0 | 176.5 |
| 20 | 4 | 20 | 390 | 155.9 | 5.9 | 154.3 | 0.9387 | 115.8 | 3.068 | 3.500 | 40.36 | y | 142.3 | 179.1 |
| 21 | 5 | 20 | 410 | 154.5 | 1.4 | 154.6 | 0.9741 | 70.1 | 4.026 | 4.500 | 21.33 | y | 104.1 | 173.5 |
| 22 | 5 | 20 | 430 | 152.9 | 1.6 | 156.1 | 1.0000 | 72.9 | 4.026 | 4.500 | 22.18 | y | 103.9 | 167.8 |
| 23 | 5 | 20 | 450 | 151.7 | 1.2 | 160.6 | 1.0000 | 74.7 | 4.026 | 4.500 | 22.73 | y | 104.0 | 161.5 |
| 24 | 5 | 20 | 470 | 150.5 | 1.2 | 164.8 | 1.0000 | 76.5 | 4.026 | 4.500 | 23.27 | y | 104.6 | 153.3 |
| 25 | 5 | 20 | 490 | 149.3 | 1.2 | 168.8 | 1.0000 | 78.2 | 4.026 | 4.500 | 23.79 | y | 105.2 | 145.4 |
| 26 | 5 | 20 | 510 | 148.0 | 1.3 | 172.5 | 1.0000 | 79.8 | 4.026 | 4.500 | 24.28 | y | 105.3 | 138.0 |
| 27 | 6 | 20 | 530 | 146.8 | 1.2 | 172.4 | 1.0000 | 80.6 | 4.026 | 4.500 | 24.52 | n | 0.0 | 0.0 |
| 28 | 6 | 20 | 550 | 145.6 | 1.2 | 172.3 | 1.0000 | 81.4 | 4.026 | 4.500 | 24.77 | n | 0.0 | 0.0 |
| 29 | 6 | 10 | 560 | 144.5 | 1.1 | 172.2 | 1.0000 | 82.1 | 4.026 | 4.500 | 24.98 | n | 0.0 | 0.0 |

As indicated in Table 14, the flashline heater of Example 7 has twenty-nine segments which have a total length of 560 ft. In Example 7, the flashline heater has an inner diameter which increases along the length of the flashline heater. Particularly, the segments of the first segment set have an inner diameter of 1.500 in and are not heated. The segments of the second segment set have an inner diameter of 1.939 in and are not heated. The segments of the third segment set have an inner diameter of 1.939 in and are heated. The segments of the fourth segment set have an inner diameter of 3.068 in and are heated. The segments of the fifth segment set have an inner diameter of 4.026 in and are heated. The segments of the sixth segment set have an inner diameter of 4.026 in and are not heated. The average velocity of polymerization product through the heater ranges from about 46.3 ft/sec to about 131.6 ft/sec. The Froude number is calculated in each segment of the flashline heater, and the Froude number ranges from about 21.33 to about 57.69. The residence time of the polymerization product in the flashline heater of Example 7 is about 7.57 seconds.

Example 8

The operating conditions for Example 8 are disclosed in Table 15 below. The same parameters as in Tables 1, 3, 5, 7, 9, 11, and 13 are shown, with values specific for Example 8.

TABLE 15

| | |
|---|---|
| First Pressure Differential | 263.5 psi |
| Second Pressure Differential | 213.3 psi |
| Total Pressure Differential | 476.8 psi |
| Slurry Composition | |
| Methane | 26.3 lb/hr |
| Ethylene | 996.8 lb/hr |
| Ethane | 289.9 lb/hr |
| Propane | 60.3 lb/hr |
| Isobutane | 28016.9 lb/hr |
| Butane | 740.9 lb/hr |
| Hexene | 660.2 lb/hr |
| Hexane | 62.9 lb/hr |
| Solid Polymer | 30,000 lb/hr |
| Solid Polymer | 48.4 wt % |
| Continuous Take-Off (CTO) Valve | |
| Inlet Temperature | 197.6° F. |
| Outlet Temperature | 195.5° F. |
| Inlet Pressure | 615.0 psia |
| Outlet Pressure | 351.5 psia |
| Vapor Fraction | 0.0353 wt |
| Steam | |
| Temperature | 222° F. |
| Separation Vessel | |
| Pressure | 140 psia |
| Temperature | 175° F. |
| Elevation | 150 ft |

As can be seen in Table 15, the first pressure differential is greater than the second pressure differential. Particularly, the first pressure differential is about 55.3% of the total pressure differential, and the second pressure differential is about 44.7% of the total pressure differential. The polymerization product exiting the CTO is a mixture having 3.53% vapor phase by weight of the mixture. The particular operating conditions of the flashline heater of Example 8 are shown in Table 16.

TABLE 16

| Segment (#) | Segment Set (#) | Segment Length (ft) | Total Length (ft) | Outlet Pressure (psia) | Drop in Pressure (psi) | Outlet Temp (° F.) | Vapor Fraction (wt) | Avg Velocity (ft/sec) | ID (in) | OD (in) | Froude No. | Heated (y/n) | Overall $U_o$ (B/hr-ft²-F.) | Duty (1k B/hr) |
|---|---|---|---|---|---|---|---|---|---|---|---|---|---|---|
| 1 | 1 | 30 | 30 | 341.7 | 9.8 | 195.0 | 0.0072 | 24.8 | 1.939 | 2.375 | 10.87 | n | 0.0 | 0.0 |
| 2 | 1 | 30 | 60 | 333.4 | 8.3 | 193.7 | 0.0270 | 25.3 | 1.939 | 2.375 | 11.09 | n | 0.0 | 0.0 |
| 3 | 1 | 30 | 90 | 325.7 | 7.7 | 192.5 | 0.0456 | 27.4 | 1.939 | 2.375 | 12.01 | n | 0.0 | 0.0 |
| 4 | 1 | 30 | 120 | 318.0 | 7.7 | 191.2 | 0.0646 | 29.7 | 1.939 | 2.375 | 13.02 | n | 0.0 | 0.0 |
| 5 | 1 | 30 | 150 | 310.1 | 7.9 | 189.8 | 0.0844 | 32.3 | 1.939 | 2.375 | 14.16 | n | 0.0 | 0.0 |
| 6 | 1 | 30 | 180 | 304.1 | 6.0 | 188.7 | 0.0993 | 34.3 | 1.939 | 2.375 | 15.04 | n | 0.0 | 0.0 |
| 7 | 2 | 40 | 220 | 299.3 | 4.8 | 188.9 | 0.1291 | 33.5 | 2.067 | 2.375 | 14.22 | y | 140.2 | 92.6 |
| 8 | 2 | 40 | 260 | 293.7 | 5.6 | 188.7 | 0.1628 | 37.2 | 2.067 | 2.375 | 15.80 | y | 144.2 | 95.3 |
| 9 | 2 | 40 | 300 | 286.9 | 6.8 | 188.3 | 0.2045 | 42.6 | 2.067 | 2.375 | 18.09 | y | 167.7 | 111.7 |
| 10 | 2 | 40 | 340 | 278.6 | 8.3 | 187.6 | 0.2547 | 49.1 | 2.067 | 2.375 | 20.85 | y | 185.6 | 125.8 |
| 11 | 2 | 40 | 380 | 268.5 | 10.1 | 186.2 | 0.3139 | 57.3 | 2.067 | 2.375 | 24.33 | y | 195.9 | 132.3 |
| 12 | 2 | 40 | 420 | 255.7 | 12.8 | 183.9 | 0.3855 | 68.3 | 2.067 | 2.375 | 29.00 | y | 201.9 | 149.6 |
| 13 | 2 | 40 | 460 | 239.1 | 16.6 | 180.1 | 0.4743 | 83.9 | 2.067 | 2.375 | 35.62 | y | 205.6 | 166.8 |
| 14 | 2 | 40 | 500 | 194.3 | 44.8 | 166.1 | 0.6575 | 132.0 | 2.067 | 2.375 | 56.05 | y | 209.1 | 207.7 |
| 15 | 3 | 30 | 530 | 187.9 | 6.4 | 164.5 | 0.7184 | 66.7 | 3.068 | 3.500 | 23.25 | y | 136.7 | 175.8 |
| 16 | 3 | 30 | 560 | 181.4 | 6.5 | 162.7 | 0.7802 | 74.0 | 3.068 | 3.500 | 25.79 | y | 136.3 | 180.7 |
| 17 | 3 | 30 | 590 | 174.8 | 6.6 | 161.0 | 0.8423 | 82.0 | 3.068 | 3.500 | 28.58 | y | 135.7 | 185.5 |
| 18 | 3 | 30 | 620 | 168.2 | 6.6 | 159.3 | 0.9035 | 90.7 | 3.068 | 3.500 | 31.61 | y | 135.1 | 189.9 |
| 19 | 3 | 30 | 650 | 161.8 | 6.4 | 157.8 | 0.9630 | 99.9 | 3.068 | 3.500 | 34.82 | y | 134.4 | 192.5 |
| 20 | 3 | 30 | 680 | 155.8 | 6.0 | 158.9 | 1.0000 | 108.7 | 3.068 | 3.500 | 37.88 | y | 133.7 | 188.5 |
| 21 | 3 | 30 | 710 | 150.2 | 5.6 | 164.2 | 1.0000 | 115.4 | 3.068 | 3.500 | 40.22 | y | 133.5 | 178.1 |
| 22 | 4 | 30 | 740 | 148.7 | 1.5 | 169.1 | 1.0000 | 69.0 | 4.026 | 3.500 | 20.99 | y | 97.7 | 156.0 |
| 23 | 4 | 30 | 770 | 147.3 | 1.4 | 173.6 | 1.0000 | 70.7 | 4.026 | 4.500 | 21.51 | y | 98.4 | 143.1 |
| 24 | 4 | 30 | 800 | 145.8 | 1.5 | 177.6 | 1.0000 | 72.4 | 4.026 | 4.500 | 22.03 | y | 99.1 | 131.2 |
| 25 | 4 | 30 | 830 | 144.4 | 1.4 | 181.3 | 1.0000 | 74.0 | 4.026 | 4.500 | 22.51 | y | 99.7 | 120.1 |
| 26 | 4 | 30 | 860 | 142.9 | 1.5 | 184.7 | 1.0000 | 75.6 | 4.026 | 4.500 | 23.00 | y | 100.2 | 110.0 |
| 27 | 5 | 30 | 890 | 141.5 | 1.4 | 184.6 | 1.0000 | 76.5 | 4.026 | 4.500 | 23.27 | n | 0.0 | 0 |
| 28 | 5 | 30 | 920 | 140.0 | 1.5 | 184.5 | 1.0000 | 77.4 | 4.026 | 4.500 | 23.55 | n | 0.0 | 0 |
| 29 | 5 | 30 | 950 | 138.2 | 1.8 | 184.4 | 1.0000 | 78.6 | 4.026 | 4.500 | 23.91 | n | 0.0 | 0 |

As indicated in Table 16, the flashline heater of Example 8 has twenty-nine segments which have a total length of 950 ft. In Example 8, the flashline heater has an inner diameter which increases along the length of the flashline heater. Particularly, the segments of the first segment set have an inner diameter of 1.939 in and are not heated. The segments of the second segment set have an inner diameter of 2.067 in and are heated. The segments of the third segment set have an inner diameter of 3.068 in and are heated. The segments of the fourth segment set have an inner diameter of 4.026 in and are heated. The segments of the fifth segment set have an inner diameter of 4.026 in are not heated. The average velocity of polymerization product through the heater ranges from about 24.8 ft/sec to about 132.0 ft/sec. The Froude number is calculated in each segment of the flashline heater, and the Froude number ranges from about 10.87 to about 56.05. The residence time of the polymerization product in the flashline heater of Example 8 is about 18.02 seconds.

Additional Description

Processes and systems for the production for pressure management of a polymerization product flowing from a loop polymerization reactor to a separation vessel in a slurry polymerization system have been described. The following are a first set of nonlimiting, specific embodiments in accordance with the present disclosure:

A first embodiment, which is a process for pressure management of a polymerization product in slurry polymerization, comprising withdrawing the polymerization product from a loop polymerization reactor, and conveying the withdrawn polymerization product to a separation vessel via a first pressure differential and a second pressure differential, wherein the withdrawn polymerization product flows through the first pressure differential before flowing through the second pressure differential, wherein the first pressure differential is less than the second pressure differential.

A second embodiment is the process of the first embodiment, wherein the first pressure differential has a drop in pressure between about 5% to about 50% of a total pressure differential between the loop polymerization reactor and the separation vessel, wherein the second pressure differential has a drop in pressure between about 50% to about 95% of the total pressure differential between the loop polymerization reactor and the separation vessel.

A third embodiment is the process of the second embodiment, wherein the drop in pressure of the first pressure differential is greater than 40% and less than 50% of the total pressure differential, wherein the drop in pressure of the second pressure differential is greater than 50% and less than 60% of the total pressure differential.

A fourth embodiment is the process of the second through third embodiments, wherein the drop in pressure of the first pressure differential is from a pressure of the loop polymerization reactor to a pressure less than the pressure of the loop polymerization reactor.

A fifth embodiment is the process of the first through fourth embodiments, wherein the first pressure differential is associated with a first line comprising a continuous take-off valve, wherein the second pressure differential is associated with a second line comprising a flashline heater.

A sixth embodiment is the process of the fifth embodiment, wherein the continuous take-off valve has a diameter of about 1 inch to about 8 inches, wherein the flashline heater has an inner diameter of about 2 inches to about 10 inches.

A seventh embodiment is the process of the fifth through sixth embodiments, wherein the flashline heater comprises a plurality of segments, wherein at least one of the plurality of segments has an inner diameter greater than a preceding segment of the plurality of segments.

An eighth embodiment is the process of the first through seventh embodiments, where the process further comprises conveying a mixture through the second pressure differential so that the mixture has a Froude number in a range from about 5 to about 100, wherein the mixture comprises a solid polymer and a vapor phase of at least a portion of a diluent.

A ninth embodiment is a process for pressure management of a polymerization product in slurry polymerization, comprising withdrawing a polymerization product slurry from a loop polymerization reactor, conveying the polymerization product slurry through a first line comprising a continuous take-off valve to yield a mixture, and conveying the mixture through a second line comprising a flashline heater so that the mixture has a Froude number in a range from about 5 to about 100.

A tenth embodiment is the process of the ninth embodiment, wherein a drop in pressure of the first line is less than a drop in pressure of the second line.

An eleventh embodiment is the process of the fifth through seventh and ninth through tenth embodiments, wherein the Froude number of the mixture conveyed through the flashline heater is in a range of about 15 to about 30.

A twelfth embodiment is the process of the ninth through eleventh embodiments, wherein the flashline heater comprises a plurality of segments.

A thirteenth embodiment is the process of the ninth through twelfth embodiments, wherein the conveying the mixture through the second line comprising the flashline heater comprises conveying the mixture through at least one segment of the plurality of segments of the flashline heater so that the mixture has a Froude number in a range from about 5 to about 100 in the at least one segment.

A fourteenth embodiment is the process of the seventh and twelfth through thirteenth embodiments, wherein each of the plurality of segments has an inner diameter of about 2 inches to about 10 inches.

A fifteenth embodiment is the process of the twelfth through fourteenth embodiments, wherein at least one of the plurality of segments has an inner diameter greater than an inner diameter of a preceding segment of the plurality of segments.

A sixteenth embodiment is the process of the fifth through seventh and ninth through fifteenth embodiments, wherein the flashline heater has a length and an inner diameter such that the mixture has a residence time in the flashline heater of greater than about 7 seconds.

A seventeenth embodiment is the process of the ninth through sixteenth embodiments, wherein the continuous take-off valve has a diameter of about 1 inch to about 8 inches.

An eighteenth embodiment is the process of the ninth through seventeenth embodiments, wherein the polymerization product slurry comprises a solid polymer and a liquid phase of a diluent, wherein the mixture comprises the solid polymer and a vapor phase of at least a portion of the diluent.

A nineteenth embodiment, which is a process for pressure management of a polymerization product slurry withdrawn from a loop polymerization reactor in slurry polymerization, comprising, conveying the polymerization product slurry through a continuous take-off valve, converting the polymerization product slurry to a mixture, and conveying the mixture through a flashline heater, wherein the mixture in the flashline heater has a Froude number in a range of 5 to 100.

A twentieth embodiment is the process of the fifth through seventh and nineteenth embodiments, wherein the mixture conveyed through the flashline heater has a Froude number in a range of 15 to 30.

A twenty-first embodiment is the process of the nineteenth and twentieth embodiments, wherein a drop in pressure of a first line comprising the continuous take-off valve is less than a drop in pressure of a second line comprising the flashline heater.

A twenty-second embodiment is the process of the nineteenth through twenty-first embodiments, wherein the polymerization product slurry comprises a solid polymer and a liquid phase of a diluent, wherein the mixture comprises the solid polymer and a vapor phase of at least a portion of the diluent.

A twenty-third embodiment is the process of the eighteenth and twenty-second embodiments, wherein the solid polymer comprises polyethylene, wherein the diluent comprises isobutane.

A twenty-fourth embodiment is the process of the nineteenth through twenty-third embodiments, wherein the flashline heater comprises a plurality of segments, wherein each of the plurality of segments has an inner diameter of about 2 inches to about 10 inches.

A twenty-fifth embodiment is the process of the twenty-fourth embodiment, wherein at least one of the plurality of segments has an inner diameter greater than an inner diameter of a preceding segment of the plurality of segments.

A twenty-sixth embodiment is the process of the nineteenth through twenty-fifth embodiments, wherein the flashline heater has a length and an inner diameter such that the mixture has a residence time in the flashline heater of greater than about 7 seconds.

A twenty-seventh embodiment is the process of the nineteenth through twenty-sixth embodiments, wherein the continuous take-off valve has a diameter of about 1 inch to about 8 inches.

A twenty-eighth embodiment, which is a process for pressure management of a polymerization product flowing from a loop polymerization reactor to a separation vessel in slurry polymerization, comprising conveying the polymerization product through a first line having a first pressure differential, wherein the first line comprises a continuous take-off valve, conveying the polymerization product through a second line having a second pressure differential, wherein the second line comprises a flashline heater, wherein the second line is downstream of the first line, wherein the first pressure differential is less than the second pressure differential.

A twenty-ninth embodiment is the process of the fifth through twenty-eighth embodiments, wherein at least a portion of the second line has an inner diameter greater than an inner diameter of the first line.

A thirtieth embodiment is the process of the fifth through seventh and ninth through twenty-ninth embodiments, wherein the flashline heater comprises a plurality of segments, wherein at least one segment of the plurality of segments has a diameter greater than a diameter of the continuous take-off valve.

A thirty-first embodiment is the process of the twenty-eighth through twenty-ninth embodiments, wherein the flashline heater comprises a plurality of segments, wherein at least one segment of the plurality of segments has an inner diameter greater than an inner diameter of a preceding segment of the plurality of segments.

A thirty-second embodiment is the process of the twenty-eighth through thirty-first embodiments, wherein the continuous take-off valve has a diameter of about 1 inch to about 8 inches, wherein each of the segments has an inner diameter of about 2 inches to about 10 inches.

A thirty-third embodiment is the process of the twenty-eighth through thirty-second embodiments, wherein the first pressure differential has a drop in pressure between about 5% to about 50% of a total pressure differential between the loop polymerization reactor and the separation vessel, wherein the second pressure differential has a drop in pressure between about 50% to about 95% of the total pressure differential between the loop polymerization reactor and the separation vessel.

A thirty-fourth embodiment is the process of the thirty-third embodiment, wherein the drop in pressure of the first pressure differential is greater than 40% and less than 50% of the total pressure differential, wherein the drop in pressure of the second pressure differential is greater than 50% and less than 60% of the total pressure differential.

A thirty-fifth embodiment, which is a process for pressure management of a polymerization product flowing from a loop polymerization reactor to a separation vessel in slurry polymerization, comprising conveying the polymerization product through a continuous take-off valve, and conveying the polymerization product through a flashline heater, wherein the polymerization product has a residence time in the flashline heater of greater than about 7 seconds, wherein a drop in pressure of a first line comprising the continuous take-off valve is less than a drop in pressure of a second line comprising the flashline heater.

A thirty-sixth embodiment is the process of the fifth through seventh and ninth through thirty-fifth embodiments, wherein a velocity of the polymerization product in the flashline heater is below a sonic velocity of the polymerization product.

A thirty-seventh embodiment is the process of the thirty-fifth through thirty-sixth embodiments, wherein the flashline heater comprises a plurality of segments.

A thirty-eighth embodiment is the process of the thirty-seventh embodiment, wherein each of the plurality of segments has an inner diameter of about 2 inches to about 10 inches.

A thirty-ninth embodiment is the process of the thirty-seventh through thirty-eighth embodiments, wherein at least one of the plurality of segments has an inner diameter greater than a preceding segment of the plurality of segments.

A fortieth embodiment is the process of the seventh through thirty-ninth embodiments, wherein the conveying the polymerization product through the flashline heater comprises conveying the polymerization product through the plurality of segments of the flashline heater at a velocity below a sonic velocity of the polymerization product.

A forty-first embodiment is the process of the thirty-fifth through fortieth embodiments, wherein the continuous take-off valve has a diameter of about 1 inch to about 8 inches.

A forty-second embodiment, which is a system for pressure management of a polymerization product in a loop polymerization process, which may optionally incorporate the processes embodied by the first through forty-first embodiments, the system comprising a polymerization reactor to form the polymerization product, a first line comprising a continuous take-off valve, wherein the first line receives a polymerization product slurry from the loop slurry polymerization reactor, wherein a first pressure differential is associated with the first line, a second line comprising a flashline heater, wherein the second line receives a mixture from the first line, wherein a second pressure differential is associated with the second line, and a separation vessel to receive a solid polymer from the second line, wherein the solid polymer is recovered from the separation vessel, wherein the first pressure differential is less than the second pressure differential.

A forty-third embodiment is the system of the forty-second embodiment, wherein the polymerization product slurry comprises the solid polymer and a liquid phase of a diluent, wherein the mixture comprises solid polymer and a vapor phase of at least a portion of the diluent.

A forty-fourth embodiment is the system of the forty-second through forty-third embodiments, wherein the first pressure differential has a drop in pressure between about 5% to about 50% of a total pressure differential between the loop polymerization reactor and the separation vessel, wherein the second pressure differential has a drop in pressure between about 50% to about 95% of the total pressure differential between the loop polymerization reactor and the separation vessel.

A forty-fifth embodiment is the system of the forty-fourth embodiment, wherein the drop in pressure of the first pressure differential is greater than 40% and less than 50% of the total pressure differential, wherein the drop in pressure of the second pressure differential is greater than 50% and less than 60% of the total pressure differential.

A forty-sixth embodiment is the system of the forty-second through forty-fifth embodiments, wherein the flashline heater comprises a plurality of segments, wherein at least one segment of the plurality of segments has an inner diameter greater than an inner diameter of a preceding segment of the plurality of segments.

A forty-seventh embodiment is the system of the forty-sixth embodiment, wherein each of the segments has an inner diameter of about 2 inches to about 10 inches.

A forty-eighth embodiment is the system of the forty-second through forty-seventh embodiments, wherein the continuous take-off valve has a diameter of about 1 inch to about 8 inches.

A forty-ninth embodiment is the system of the forty-second through forty-eighth embodiments, wherein the mixture conveyed through the flashline heater has a Froude number in a range from about 5 to about 100.

A fiftieth embodiment is the system of the forty-second through forty-ninth embodiments, wherein the mixture in the flashline heater has a velocity less than a sonic velocity of the mixture.

A fifty-first embodiment, which is the process of the nineteenth embodiment, wherein at least a portion of the product slurry is converted to the mixture is a line between the continuous take-off valve and the flashline heater.

A fifty-second embodiment, which is the process of nineteenth embodiment, wherein none of the product slurry is converted to the mixture prior to entering the flashline heater.

A fifty-third embodiment, which is the process of fifty-first embodiment, wherein at least a portion of the product slurry is converted to the mixture in the flashline heater.

A fifty-fourth embodiment, which is the process of fifty-second embodiment, wherein at least a portion of the product slurry is converted to the mixture in the flashline heater.

A fifty-fifth embodiment, which is the process of the twenty-first embodiment, wherein none of the product slurry is converted to the mixture in the first line.

A fifty-sixth embodiment, which is the process of the twenty-first embodiment, wherein at least a portion of the product slurry is converted to the mixture in the second line.

A fifty-seventh embodiment, which is a process for pressure management of a polymerization product in slurry polymerization, comprises withdrawing a polymerization product slurry from a loop polymerization reactor; conveying the polymerization product slurry through a first line comprising a continuous take-off valve to yield a mixture comprising a vapor phase, wherein the mixture exits the continuous take-off valve; and conveying the mixture through a second line comprising a flashline heater so that the mixture has a Froude number in a range from about 5 to about 100.

A fifty-eighth embodiment, which is the process of the fifty-seventh embodiment, wherein a drop in pressure of the first line is greater than or less than a drop in pressure of the second line.

A fifty-ninth embodiment, which is the process of the fifty-seventh through fifty-eighth embodiments, wherein the Froude number of the mixture conveyed through the flashline heater is in a range of about 10 to about 60.

A sixtieth embodiment, which is the process of the fifty-seventh through fifty-ninth embodiments, wherein the flashline heater comprises a plurality of segments.

A sixty-first embodiment, which is the process of the sixtieth embodiment, wherein the conveying the mixture through the second line comprising the flashline heater comprises conveying the mixture through at least one segment of the plurality of segments of the flashline heater so that the mixture has a Froude number in a range from about 5 to about 100 in the at least one segment.

A sixty-second embodiment, which is the process of the sixtieth through sixty-first embodiments, wherein each of the plurality of segments has an inner diameter of about 2 inches to about 10 inches.

A sixty-third embodiment, which is the process of the sixtieth through sixty-second embodiments, wherein at least one of the plurality of segments has an inner diameter greater than an inner diameter of a preceding segment of the plurality of segments.

A sixty-fourth embodiment, which is the process of the fifty-seventh through sixty-third embodiments, wherein the flashline heater has a length and one or more inner diameters such that the flashline heater provides the polymerization product a residence time of greater than about 7.5 seconds.

A sixty-fifth embodiment, which is the process of the fifty-seventh through sixty-fourth embodiments, wherein the vapor phase of the mixture may comprise greater than 0% by weight of the mixture in the first line.

A sixty-sixth embodiment, which is the process of the fifty-seventh through sixty-fifth embodiments, wherein the polymerization product slurry comprises a solid polymer and a liquid phase of a diluent, wherein the mixture further comprises the solid polymer, wherein the vapor phase of the mixture comprises at least a portion of the diluent.

A sixty-seventh embodiment, which is a process for pressure management of a polymerization product slurry withdrawn from a loop polymerization reactor in slurry polymerization, comprising: conveying the polymerization product slurry through a continuous take-off valve; converting the polymerization product slurry to a mixture comprising a vapor phase, wherein the mixture exits the continuous take-off valve; and conveying the mixture through a flashline heater, wherein the mixture conveyed through the flashline heater has a Froude number in a range of about 5 to about 100.

A sixty-eighth embodiment, which is the process of the sixty-seventh embodiment, wherein the mixture conveyed through the flashline heater has a Froude number in a range of about 10 to about 60.

A sixty-ninth embodiment, which is the process of the sixty-seventh through sixty-eight embodiments, wherein a drop in pressure of a first line comprising the continuous take-off valve is greater than or less than a drop in pressure of a second line comprising the flashline heater.

A seventieth embodiment, which is the process of the sixty-seventh through the sixty-ninth embodiments, wherein the polymerization product slurry comprises a solid polymer and a liquid phase of a diluent, wherein the mixture further comprises the solid polymer, and wherein the vapor phase of the mixture comprises at least a portion of the diluent.

A seventy-first embodiment, which is the process of the seventieth embodiment, wherein the solid polymer comprises polyethylene, wherein the diluent comprises isobutane.

A seventy-second embodiment, which is the process of the sixty-seventh through seventy-first embodiments, wherein the flashline heater comprises a plurality of segments, wherein each of the plurality of segments has an inner diameter of about 1 inches to about 10 inches.

A seventy-third embodiment, which is the process of the seventy-second embodiment, wherein at least one of the plurality of segments has an inner diameter greater than an inner diameter of a preceding segment of the plurality of segments.

A seventy-fourth embodiment, which is the process of the sixty-seventh through seventy-third embodiments, wherein the flashline heater has a length and one or more inner diameters such that the flashline heater provides a residence time of greater than about 7.5 seconds.

A seventy-fifth embodiment, which is the process of the sixty-seventh through the seventy-fourth embodiments, wherein the continuous take-off valve has a diameter of about 1 inch to about 8 inches.

A seventy-sixth embodiment, which is the process of the sixty-seventh through seventy-fifth embodiments, wherein the vapor phase of the mixture may comprise greater than 0% by weight of the mixture which exits the continuous-take off valve.

Processes and systems for the production for pressure management of a polymerization product flowing from a loop polymerization reactor to a separation vessel in a slurry polymerization system have been described.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference in the disclosure is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A process for pressure management of a polymerization product in slurry polymerization, the process comprising:
   withdrawing a polymerization product slurry from a loop polymerization reactor;
   conveying the polymerization product slurry through a first line comprising a continuous take-off valve, to yield a mixture comprising a vapor phase, wherein the mixture exits the continuous take-off valve and wherein the vapor phase of the mixture comprises greater than 0.0000% by weight of the mixture exiting the continuous take-off valve; and
   conveying the mixture through a second line comprising a flashline heater so that the mixture has a Froude number in a range from about 5 to about 100.

2. The process of claim 1, wherein the Froude number is defined as:

$$Fr = V/(D*g)^{0.5}$$

where V is an average velocity (units of ft/s) of the mixture in the flashline heater, g is the gravitational constant (322 ft/s$^2$), and D is an internal pipe diameter (units of ft) of the flashline heater.

3. The process of claim 1, wherein the Froude number of the mixture conveyed through the flashline heater is in a range of about 10 to about 60.

4. The process of claim 1, wherein a drop in pressure of the first line is less than a drop in pressure of the second line.

5. The process of claim 1, wherein the vapor phase of the mixture comprises greater than 1% by weight of the mixture exiting the continuous take-off valve.

6. The process of claim 1, wherein the vapor phase of the mixture comprises greater than 2% by weight of the mixture exiting the continuous take-off valve.

7. The process of claim 1, wherein the vapor phase of the mixture comprises greater than 3% by weight of the mixture exiting the continuous take-off valve.

8. The process of claim 1, wherein the vapor phase of the mixture comprises greater than 5% by weight of the mixture exiting the continuous take-off valve.

9. The process of claim 1, wherein the polymerization product slurry comprises a solid polymer and a liquid phase of a diluent, wherein the mixture further comprises the solid polymer, wherein the vapor phase of the mixture comprises at least a portion of the diluent.

10. A process for pressure management of a polymerization product slurry withdrawn from a loop polymerization reactor in slurry polymerization, the process comprising:

conveying the polymerization product slurry through a continuous take-off valve;

converting the polymerization product slurry to a mixture comprising a vapor phase, wherein the mixture exits the continuous take-off valve and wherein the vapor phase of the mixture comprises greater than 0.0000% by weight of the mixture exiting the continuous take-off valve; and conveying the mixture through a flashline heater, wherein the mixture conveyed through the flashline heater has a Froude number in a range of 5 to 100.

11. The process of claim 10, wherein the Froude number is defined as:

$$Fr = V/(D*g)^{0.5}$$

where V is an average velocity (units of ft/s) of the mixture in the flashline heater, g is the gravitational constant (32.2 ft/s$^2$), and D is an internal pipe diameter (units of ft) of the flashline heater.

12. The process of claim 10, wherein the mixture conveyed through the flashline heater has a Froude number in a range of 10 to 60.

13. The process of claim 10, wherein a drop in pressure of a first line comprising the continuous take-off valve is less than a drop in pressure of a second line comprising the flashline heater.

14. The process of claim 10, wherein the polymerization product slurry comprises a solid polymer and a liquid phase of a diluent, wherein the mixture further comprises the solid polymer, and wherein the vapor phase of the mixture comprises at least a portion of the diluent.

15. The process of claim 14, wherein the solid polymer comprises polyethylene, wherein the diluent comprises isobutane.

16. The process of claim 10, wherein the vapor phase of the mixture comprises greater than 1% by weight of the mixture exiting the continuous take-off valve.

17. The process of claim 10, wherein the vapor phase of the mixture comprises greater than 3% by weight of the mixture exiting the continuous take-off valve.

18. The process of claim 10, wherein the vapor phase of the mixture comprises greater than 5% by weight of the mixture exiting the continuous take-off valve.

19. The process of claim 1, wherein the vapor phase of the mixture comprises greater than 5% by weight of the mixture exiting the continuous take-off valve.

20. The process of claim 9, wherein the solid polymer comprises polyethylene, wherein the diluent comprises isobutane.

* * * * *